(12) United States Patent
Wilde et al.

(10) Patent No.: US 10,884,487 B2
(45) Date of Patent: Jan. 5, 2021

(54) POSITION BASED ENERGY MINIMIZING FUNCTION

(71) Applicant: Microsoft Technology Licensing, LLC, Redmond, WA (US)

(72) Inventors: Daniel Stephen Wilde, Cambridge (GB); Timothy James Hutton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/361,028

(22) Filed: Mar. 21, 2019

(65) Prior Publication Data

US 2020/0301500 A1 Sep. 24, 2020

(51) Int. Cl.
*G06F 3/01* (2006.01)
*G06F 3/0484* (2013.01)
*G06T 7/20* (2017.01)

(52) U.S. Cl.
CPC .......... *G06F 3/011* (2013.01); *G06F 3/04845* (2013.01); *G06T 7/20* (2013.01); *G06T 2207/30196* (2013.01)

(58) Field of Classification Search
CPC ........ G06F 3/011; G06F 3/017; G06F 3/0484; G06F 3/04845; G06T 19/006
See application file for complete search history.

(56) References Cited

U.S. PATENT DOCUMENTS

| 2011/0261083 | A1 | 10/2011 | Wilson et al. |
| 2016/0179209 | A1 | 6/2016 | Anderson |
| 2017/0031502 | A1 | 2/2017 | Rosenberg et al. |
| 2017/0228130 | A1* | 8/2017 | Palmaro ............... G06F 3/0485 |
| 2018/0061003 | A1* | 3/2018 | Kono .................. G06F 3/04815 |

FOREIGN PATENT DOCUMENTS

WO 2014113454 A1 7/2014

OTHER PUBLICATIONS

Jia, Grasping deformable planar objects: Squeeze, stick/slip analysis, and energy-based optimalities, The International Journal of Robotics Research, 2014, vol. 33(6), 866-897.*

(Continued)

*Primary Examiner* — Yuzhen Shen
(74) *Attorney, Agent, or Firm* — Alleman Hall Creasman & Tuttle LLP

(57) ABSTRACT

A computer system is provided that includes an input system and a processor that may be configured to control a virtual manipulator based on input data received from the input system. The processor is further configured to determine an initial state of a system that includes at least an initial state of the virtual manipulator and an initial state of a virtual object, detect at least one contact point between a portion of the virtual manipulator and the virtual object. The processor is further configured to calculate a subsequent state for the virtual object that minimizes a set of energies or residuals defined in terms of the one or more positional quantities determined for the initial state of the system and the one or more positional quantities determined for the subsequent state of the system using a position-based energy minimizing function.

20 Claims, 18 Drawing Sheets

(56) References Cited

OTHER PUBLICATIONS

Hasson, Energy margins in dynamic object manipulation, J Neurophysiol, 2012, vol. 108, 1349-1365.*

Mendes, A Survey on 3D Virtual Object Manipulation: From the Desktop to Immersive Virtual Environments, Computer Graphics Forum, Mar. 15, 2019, vol. 38, No. 1, pp. 21-45.*

"International Search Report and Written Opinion Issued in PCT Application No. PCT/US20/015985", dated May 29, 2020, 12 Pages.

* cited by examiner

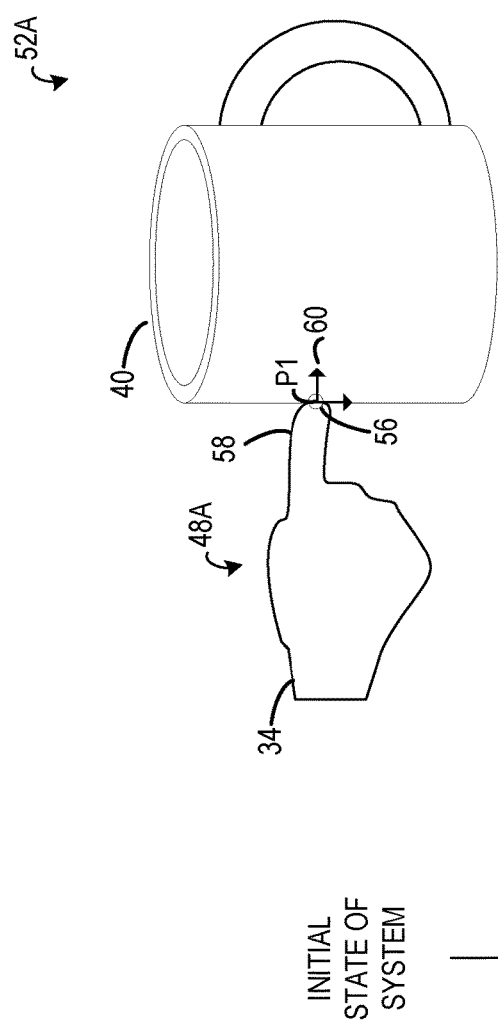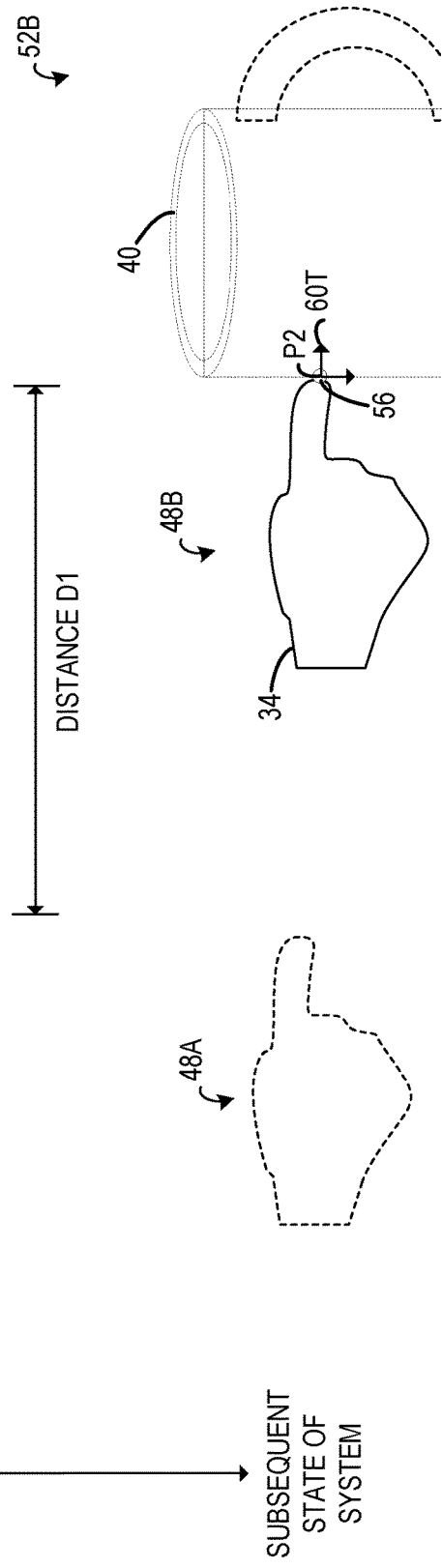
FIG. 5A
FIG. 5B

600

BASED ON DETECTING THE AT LEAST ONE CONTACT POINT BETWEEN THE PORTION OF THE VIRTUAL MANIPULATOR AND THE VIRTUAL OBJECT, DETERMINING A RELATIVE STATE OF THE VIRTUAL OBJECT COMPARED TO THE FRAME OF REFERENCE OF THE VIRTUAL MANIPULATOR 602

CALCULATING THE SUBSEQUENT STATE FOR THE VIRTUAL OBJECT THAT MINIMIZES AN ENERGY OR RESIDUAL DEFINED IN TERMS OF THE RELATIVE STATE OF THE VIRTUAL OBJECT COMPARED TO THE FRAME OF REFERENCE OF THE VIRTUAL MANIPULATOR FOR THE INITIAL STATE OF THE SYSTEM AND THE RELATIVE STATE OF THE VIRTUAL OBJECT COMPARED TO THE FRAME OF REFERENCE OF THE VIRTUAL MANIPULATOR FOR THE SUBSEQUENT STATE OF THE SYSTEM 604

DETERMINING A CLOSEST POINT ON THE FIRST ARTICULABLE PORTION RELATIVE TO THE SECOND ARTICULABLE PORTION 802

DETERMINING A CLOSEST POINT ON THE SECOND ARTICULABLE PORTION RELATIVE TO THE FIRST ARTICULABLE PORTION 804

DETERMINING A LINE THAT INTERSECTS THE CLOSEST POINT ON THE FIRST ARTICULABLE PORTION AND THE CLOSEST POINT ON THE SECOND ARTICULABLE PORTION AND EXTENDS OUTWARD FROM THE CLOSEST POINTS 806

DETECTING AT LEAST TWO POINTS ON THE SURFACE OF THE VIRTUAL OBJECT THAT INTERSECT THE LINE AS BEING THE AT LEAST TWO CONTACT POINTS 808

DETERMINING THE POSITION FOR THE AT LEAST TWO CONTACT POINTS BASED ON THE INTERSECTIONS BETWEEN THE LINE AND THE SURFACE OF THE VIRTUAL OBJECT 810

DETERMINING THE NORMAL FOR THE AT LEAST TWO CONTACT POINTS TO BE PARALLEL TO THE LINE 812

CALCULATING THE SUBSEQUENT STATE FOR THE VIRTUAL OBJECT THAT MINIMIZES AN ENERGY OR RESIDUAL DEFINED IN TERMS OF THE ONE OR MORE NORMALS FOR THE AT LEAST TWO CONTACT POINTS DETERMINED FOR THE INITIAL STATE OF THE SYSTEM AND THE ONE OR MORE NORMALS FOR THE AT LEAST TWO CONTACT POINTS DETERMINED FOR THE SUBSEQUENT STATE OF THE SYSTEM USING THE POSITION-BASED ENERGY MINIMIZING FUNCTION 814

```
┌─────────────────────────────────────────────────────────────────────────┐
│ CONTROLLING AT LEAST TWO VIRTUAL MANIPULATORS BASED ON INPUT DATA       │
│ RECEIVED FROM THE INPUT SYSTEM, EACH VIRTUAL MANIPULATOR RESPECTIVELY   │
│ INCLUDING AT LEAST A FIRST ARTICULABLE PORTION AND A SECOND             │
│ ARTICULABLE PORTION 1402                                                │
└─────────────────────────────────────────────────────────────────────────┘
                                    ↓
┌─────────────────────────────────────────────────────────────────────────┐
│ DETECTING AT LEAST TWO PAIRS OF CONTACT POINTS INCLUDING A FIRST PAIR   │
│ OF CONTACT POINTS BETWEEN A FIRST VIRTUAL MANIPULATOR AND THE VIRTUAL   │
│ OBJECT AND A SECOND PAIR OF CONTACT POINTS BETWEEN A SECOND VIRTUAL     │
│ MANIPULATOR AND THE VIRTUAL OBJECT 1404                                 │
└─────────────────────────────────────────────────────────────────────────┘
                                    ↓
┌─────────────────────────────────────────────────────────────────────────┐
│ DETERMINING ONE OR MORE POSITIONAL QUANTITIES FOR THE INITIAL STATE OF  │
│ THE SYSTEM THAT INCLUDES AT LEAST INITIAL STATES FOR THE AT LEAST TWO   │
│ VIRTUAL MANIPULATORS, THE INITIAL STATE FOR THE VIRTUAL OBJECT, AND AN  │
│ INITIAL STATE FOR THE FIRST PAIR OF CONTACT POINTS AND SECOND PAIR OF   │
│ CONTACT POINTS 1406                                                     │
└─────────────────────────────────────────────────────────────────────────┘
                                    ↓
┌─────────────────────────────────────────────────────────────────────────┐
│ DETECTING SUBSEQUENT STATES OF THE AT LEAST TWO VIRTUAL MANIPULATORS    │
│ 1408                                                                    │
└─────────────────────────────────────────────────────────────────────────┘
                                    ↓
┌─────────────────────────────────────────────────────────────────────────┐
│ DETERMINING ONE OR MORE POSITIONAL QUANTITIES FOR THE SUBSEQUENT STATE  │
│ OF THE SYSTEM 1410                                                      │
└─────────────────────────────────────────────────────────────────────────┘
                                    ↓
┌─────────────────────────────────────────────────────────────────────────┐
│ CALCULATING THE SUBSEQUENT STATE FOR THE VIRTUAL OBJECT THAT MINIMIZES  │
│ THE SET OF ENERGIES OR RESIDUALS DEFINED IN TERMS OF THE ONE OR MORE    │
│ POSITIONAL QUANTITIES DETERMINED FOR THE INITIAL STATE OF THE SYSTEM    │
│ AND THE ONE OR MORE POSITIONAL QUANTITIES DETERMINED FOR THE            │
│ SUBSEQUENT STATE OF THE SYSTEM USING THE POSITION-BASED ENERGY          │
│ MINIMIZING FUNCTION 1412                                                │
└─────────────────────────────────────────────────────────────────────────┘
```

FIG. 14

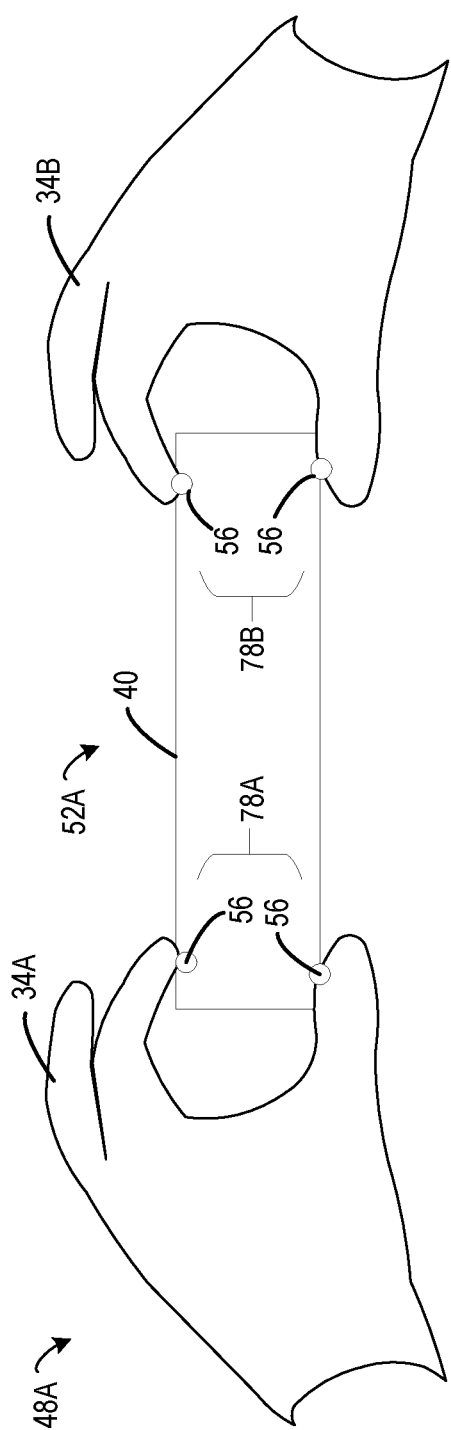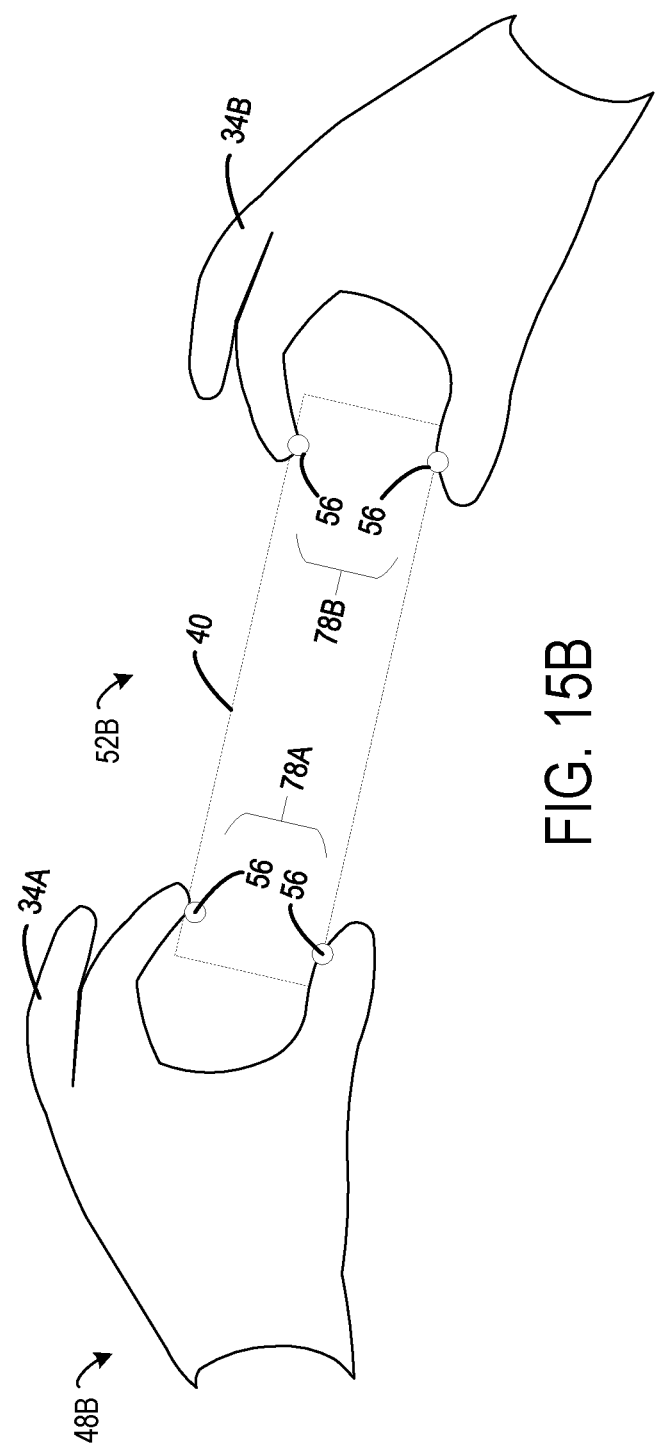

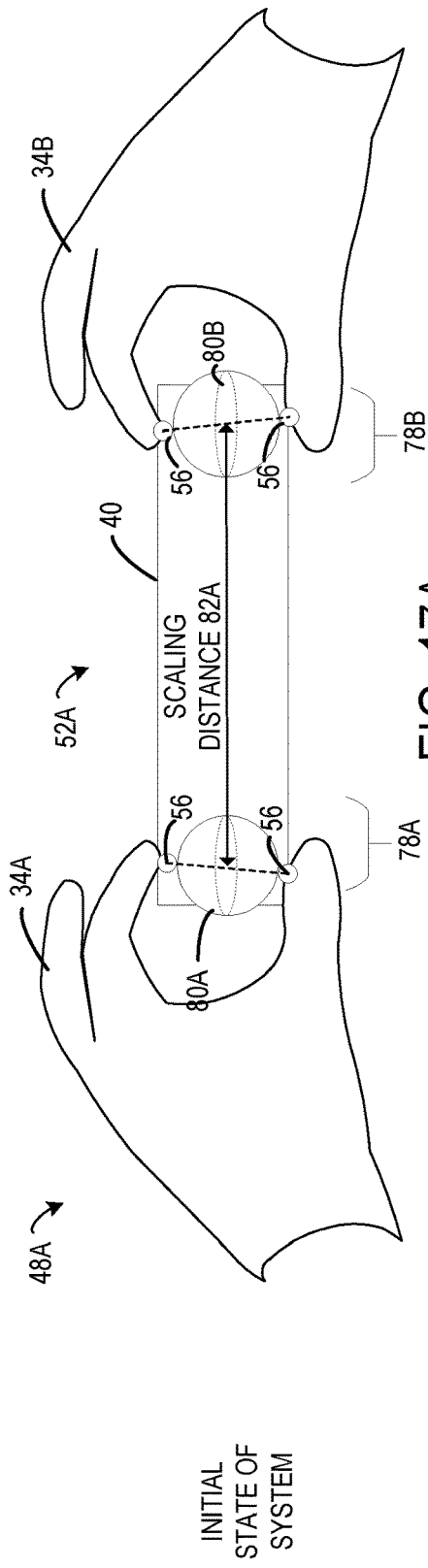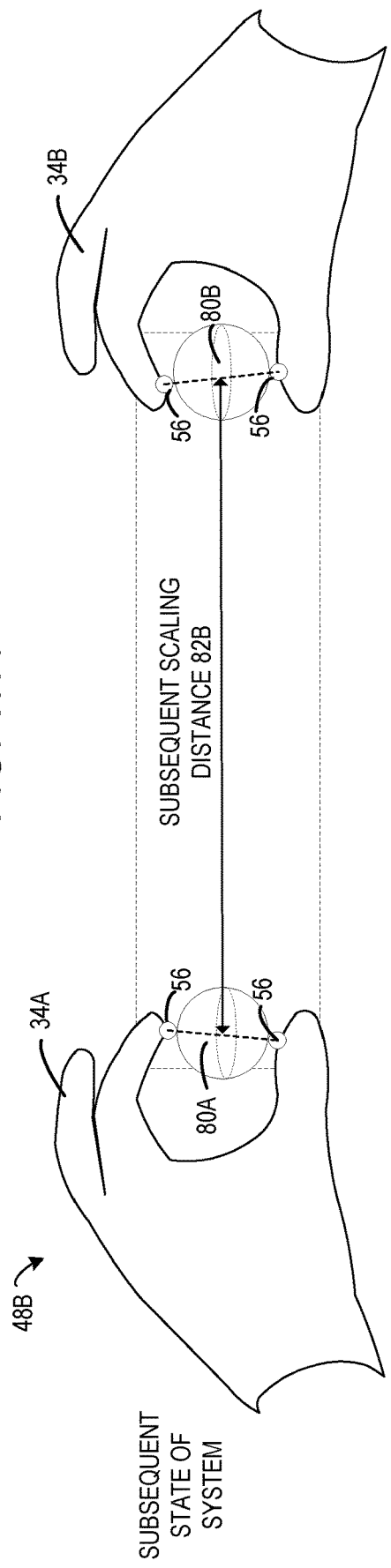

US 10,884,487 B2

POSITION BASED ENERGY MINIMIZING FUNCTION

BACKGROUND

Mixed reality three-dimensional interfaces may incorporate hand tracking to manipulate virtual objects. These interfaces may identify gesture inputs, such as an air tap, to begin interaction between the user's hand and those virtual objects.

SUMMARY

A computer system is provided that comprises an input system and a processor configured to control a virtual manipulator based on input data received from the input system. The virtual manipulator is configured to manipulate a virtual object in a virtual environment. The processor is further configured to determine an initial state of a system that includes at least an initial position of the virtual manipulator and an initial position of the virtual object, detect at least one contact point between a portion of the virtual manipulator and the virtual object. The processor is configured to determine one or more positional quantities for the initial state of the system, detect a subsequent position of the virtual manipulator, and determine one or more positional quantities for a subsequent state of the system that includes the subsequent state of the virtual manipulator. The processor is further configured to calculate a subsequent state for the virtual object that minimizes a set of energies or residuals defined in terms of the one or more positional quantities determined for the initial state of the system and the one or more positional quantities determined for the subsequent state of the system using a position-based energy minimizing function. The processor is further configured to move the virtual object to the calculated subsequent state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A shows a virtual manipulator contacting a virtual object in a virtual environment executed by the computer system of FIG. 1.

FIG. 5B shows the virtual manipulator of manipulating a virtual object in the virtual environment executed by the computer system of FIG. 1.

FIG. 6 shows a flowchart for an example method of manipulating a virtual object by attaching the virtual object to a frame of reference of a virtual manipulator in the virtual environment executed by the computer system of FIG. 1.

FIG. 8 shows a flowchart for a method of calculating positions and normals for contact points between a virtual object and a virtual manipulator in the virtual environment executed by the computer system of FIG. 1.

FIG. 14 shows a flowchart of a method for manipulating a virtual object using at least two virtual manipulators in the virtual environment executed by the computer system of FIG. 1.

FIG. 15A shows an example of a virtual object being grasped by two virtual manipulators in the virtual environment executed by the computer system of FIG. 1.

FIG. 15B shows an example of a virtual object being manipulated by two virtual manipulators in the virtual environment executed by the computer system of FIG. 1.

FIG. 17A shows a virtual object being scaled using two virtual manipulators in the virtual environment executed by the computer system of FIG. 1.

FIG. 17B shows a virtual object being scaled using two virtual manipulators in the virtual environment executed by the computer system of FIG. 1.

DETAILED DESCRIPTION

Mixed reality three-dimensional interfaces may incorporate hand tracking to manipulate virtual objects. These interfaces may identify gesture inputs, such as an air tap, to begin interaction between the user's hand and those virtual objects. Typically, these mixed reality interfaces use impulse based physics to simulate dynamics at the contact points between the user's hands and the virtual objects. These impulse based physics simulations typically treat each object as a rigid body, and attempts to simulate the forces that would be applied to those objects using impulse force equations. However, the act of grasping objects includes complex dynamics that typical real-time interaction systems incorrectly model. For example, grasping objects may include factors such as soft deformation of the hand, specific friction properties of the hand and the virtual object, and other factors that typical system incorrectly simulate.

These impulse based physics simulators may potentially improperly simulate grasping physics by incorrectly calculating forces and torques despite the user intending to hold an object still, thus causing the object to accelerate in unintended ways. These simulations may also potentially include large potential energies and instability due to deep penetrations of the user's hand into the virtual objects.

Figure 1:
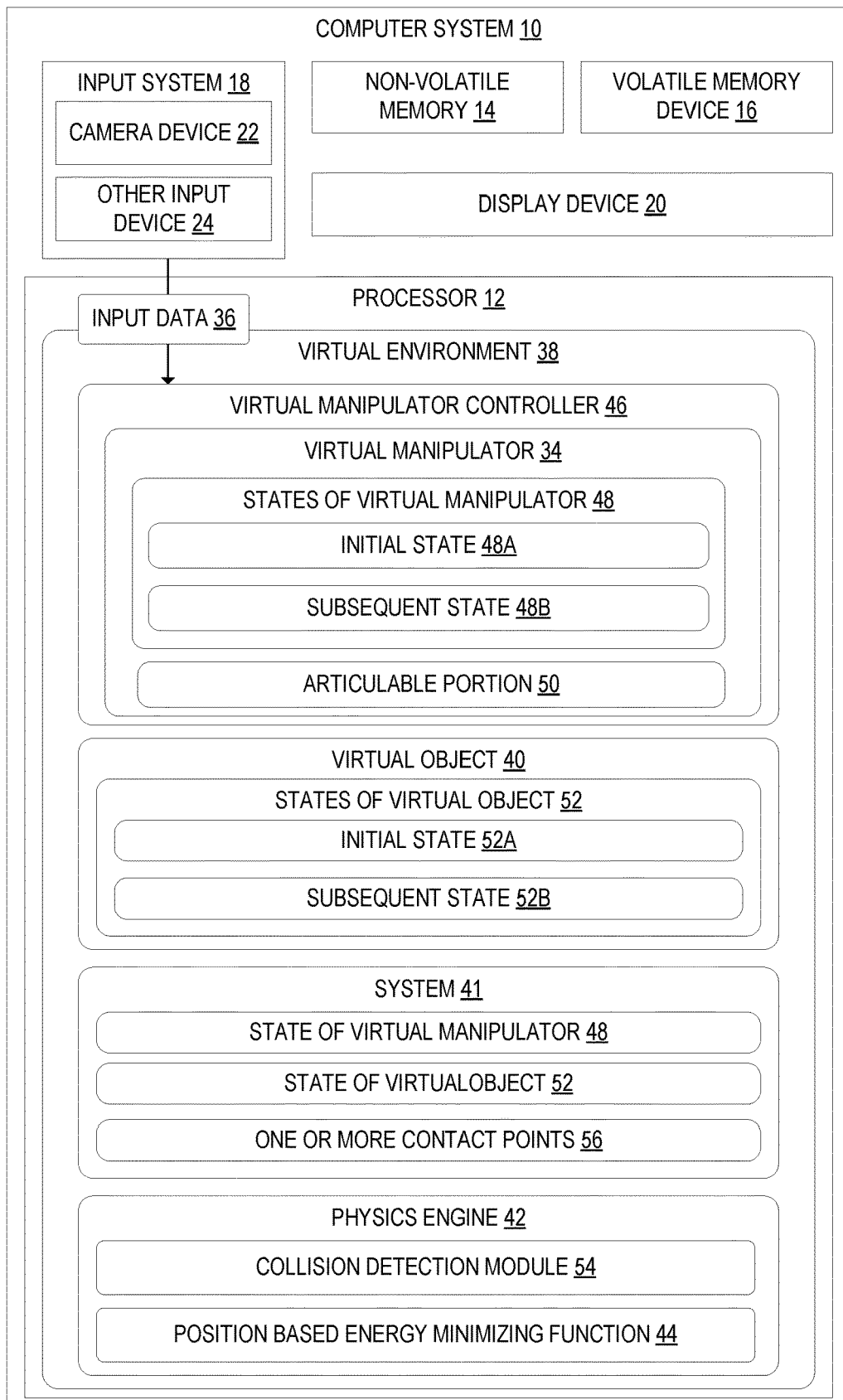
FIG. 1 shows a schematic view of an example computer system that performs physics simulations using position based energy minimizing functions.

To address these issues, FIG. 1 illustrates a computer system 10 that is configured to perform physics simulations using position-based energy minimizing functions. Computer system 10 may take the form of a head mounted display (HMD) device, a desktop computer device, a mobile computer device, or another suitable form. The computer system 10 comprises a processor 12, a non-volatile memory device 14, a volatile memory device 16, an input system 18, and a display device 20. In one example, the input system 18 may include a camera device 22 and/or another input device 24. It should be appreciated that the computer system 10 may include other computer components not specifically enumerated herein.

The camera device 22 may include a red-green-blue (RGB) camera and a depth camera configured to take RGB and depth images of a scene in front of the camera device 22. In one example, the camera device 22 may include one or more cameras located in different positions in the physical environment. In an HMD device example, the camera device 22 may take the form of outward facing cameras on the HMD device.

In another example, the input system 18 may include one or more other types of input devices 24, such as, for example, a keyboard and mouse, a handheld controller, accelerometer and inertial sensor devices on an HMD device, etc. In one example, the display device 20 may take the form of a stand-alone display, a display screen of a mobile device, a large format display, etc. In an HMD device example, the display device 20 may take the form of a near-eye display integrated with the HMD device.

Figure 2:
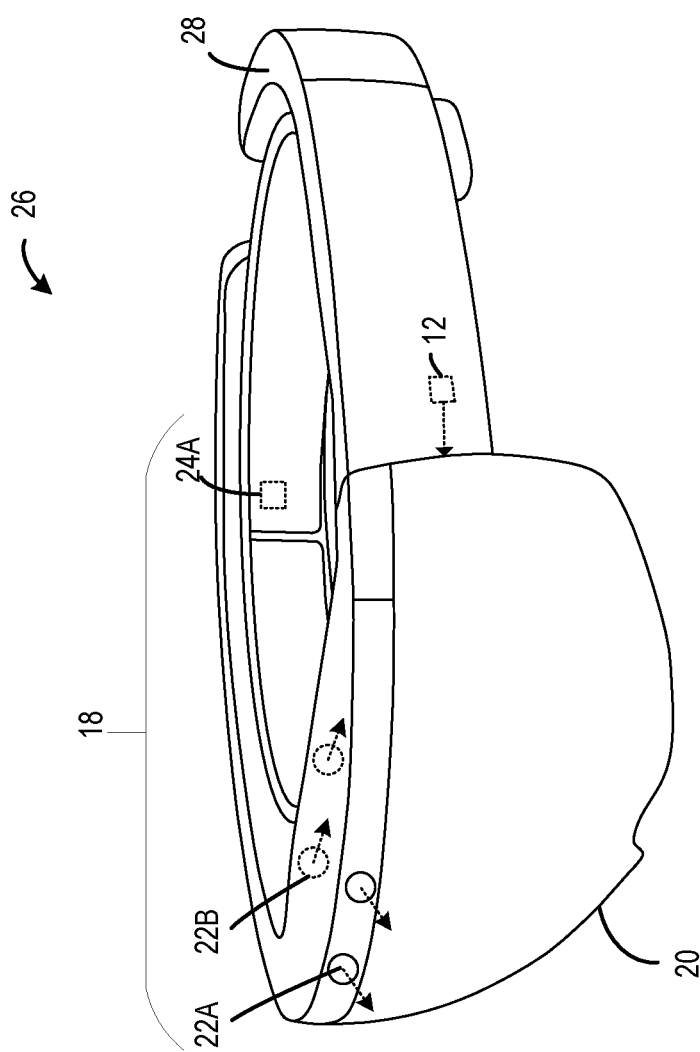
FIG. 2 shows an example head mounted display device configuration of the example computer system of FIG. 1.

FIG. 2 illustrates an example computer system 10 in the form of an HMD device 26. The HMD device 26 may be worn by a user according to an example of the present disclosure. The HMD device 26 may include a frame 28 that wraps around the head of the user to position the display device 20, which takes the form of a near-eye display in this example, close to the user's eyes. In one example, the near-eye display 20 may take the form of a substantially non-see-through display in a virtual reality HMD device configuration. In other examples, the near-eye display 20 may take the form of an at least partially see-through display that is supported in front of a viewer's eye or eyes in an augmented reality HMD device configuration.

As illustrated in FIG. 2, the frame supports additional components of the HMD device 26, such as, for example, the processor 12 and the input system 18. The processor 12 includes logic and associated computer memory configured to provide image signals to the display device 20, to receive sensory signals from the input system 18, and to enact various control processes described herein.

Any suitable display technology and configuration may be used to display images via the display device 20. For example, in a non-augmented reality configuration, the display device 20 may be a non-see-through Light-Emitting Diode (LED) display, a Liquid Crystal Display (LCD), or any other suitable type of non-see-through display. In an augmented reality configuration, the display device 20 may be configured to enable a wearer of the HMD device 26 to view a physical, real-world object in the physical environment through one or more partially transparent pixels displaying virtual object representations. For example, the display device 20 may include image-producing elements such as, for example, a see-through Organic Light-Emitting Diode (OLED) display.

As another example, the HMD device 26 may include a light modulator on an edge of the display device 20. In this example, the display device 20 may serve as a light guide for delivering light from the light modulator to the eyes of a wearer. In other examples, the display device 20 may utilize a liquid crystal on silicon (LCOS) display.

The input system 18 may include various sensors and related systems to provide information to the processor 12. Such sensors may include an inertial measurement unit (IMU) 24A. The camera device 22 may include one or more outward facing camera devices 22A. In one example, the camera device 22 may also include one or more inward facing camera devices 22B. The one or more inward facing camera devices 22B may be configured to acquire image data in the form of gaze tracking data from a wearer's eyes.

The one or more outward facing camera devices 22A may be configured to capture images of a scene in front of the HMD device 26. In one example, the one or more outward facing camera devices 22A may include a visible-light camera or RBG camera configured to collect a visible-light image of a physical space. Further, the one or more outward facing camera devices 22A may include a depth camera configured to collect a depth image of a physical space. More particularly, in one example the depth camera is an infrared time-of-flight depth camera. In another example, the depth camera is an infrared structured light depth camera.

Data from the outward facing camera devices 22A may be used by the processor 12 to generate and/or update a three-dimensional (3D) model of the physical environment. Data from the outward facing camera devices 22B may be used by the processor 12 to identify and track a hand of a user that is in front of the HMD device 26. The processor 12 may execute instructions to track the user's hand and control a virtual manipulator based on the user's tracked hand, as will be described in more detail below.

In augmented reality configurations of HMD device 26, the position and/or orientation of the HMD device 26 relative to the physical environment may be assessed so that augmented-reality images may be accurately displayed in desired real-world locations with desired orientations. For example, processor 12 may execute instructions to generate a 3D model of the physical environment and perform simultaneous localization and mapping processes. In both augmented reality and non-augmented reality configurations of HMD device 26, the IMU 24A of HMD device 26 may be configured to provide position and/or orientation data of the HMD device 26 to the processor 12. In one implementation, the IMU 24A may be configured as a three-axis or three-degree of freedom (3DOF) position sensor system.

This example position sensor system may, for example, include three gyroscopes to indicate or measure a change in orientation of the HMD device 26 within 3D space about three orthogonal axes (e.g., roll, pitch, and yaw). The orientation derived from the sensor signals of the IMU may be used to display, via the display device 20, one or more holographic images with a realistic and stable position and orientation.

In another example, the IMU 24A may be configured as a six-axis or six-degree of freedom (6DOF) position sensor system. Such a configuration may include three accelerometers and three gyroscopes to indicate or measure a change in location of the HMD device 26 along three orthogonal spatial axes (e.g., x, y, and z) and a change in device orientation about three orthogonal rotation axes (e.g., yaw, pitch, and roll). In some implementations, position and orientation data from the outward facing camera devices 22A and the IMU 24A may be used in conjunction to determine a position and orientation (or 6DOF pose) of the HMD device 26.

In some examples, a 6DOF position sensor system may be used to display holographic representations in a world-locked manner. A world-locked holographic representation appears to be fixed relative to one or more real world objects viewable through the HMD device 24, thereby enabling a wearer of the HMD device 24 to move around a real world physical environment while perceiving a world-locked hologram as remaining stationary in a fixed location and orientation relative to the one or more real world objects in the physical environment.

Figure 3:
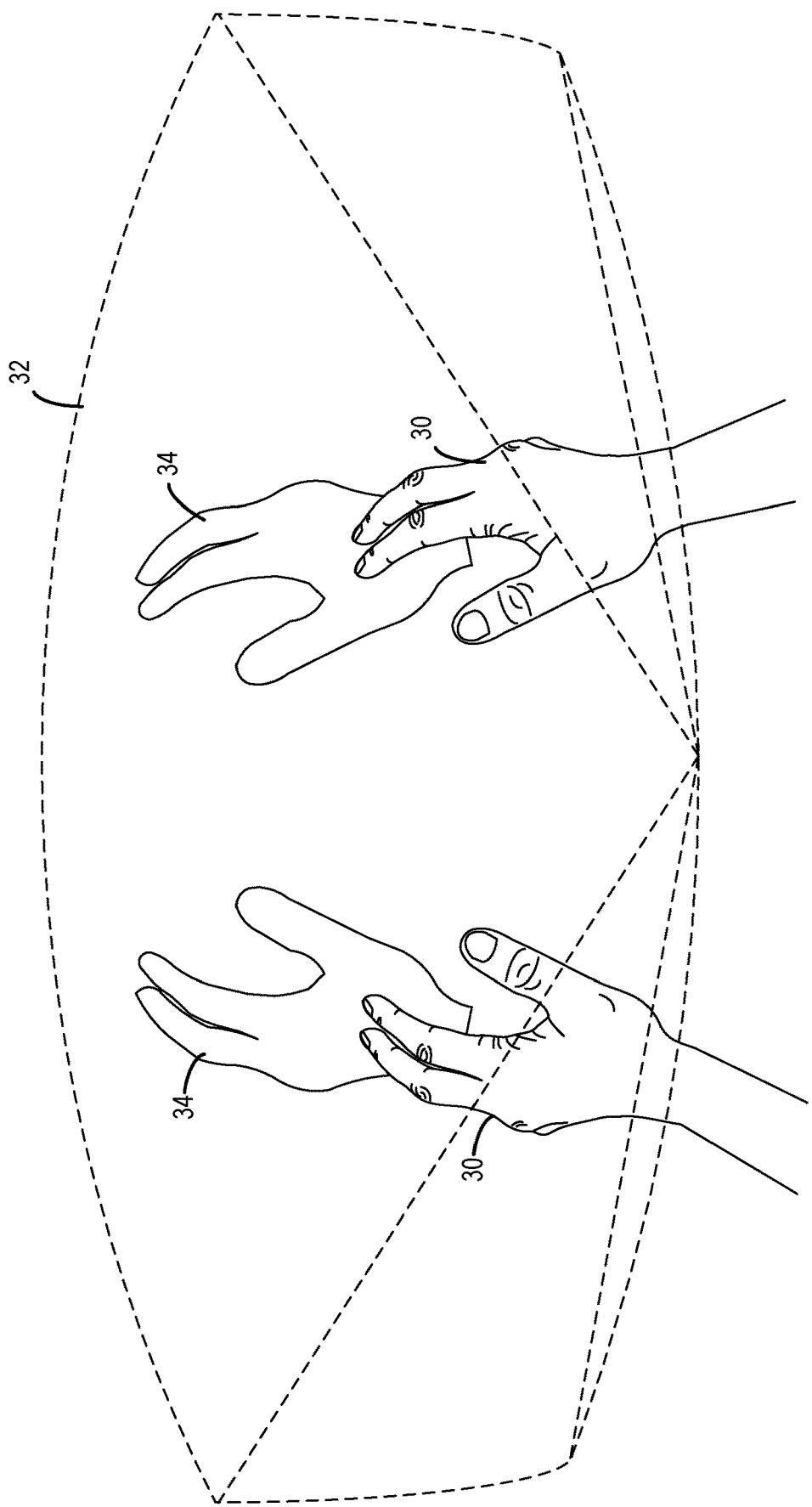
FIG. 3 shows an example of hand tracking to control virtual manipulators using the computer system of FIG. 1.

Images captured by the one or more outward facing cameras 22A may be used to track the hands of a user and control one or more virtual manipulators. FIG. 3 shows an example of a user's hands 30 in the field of view 32 of the one or more outward facing cameras 22A. The processor 12 may be configured to perform skeletal tracking of the user's hands 30 to track a position of the user's hands 30. The processor 12 may be further configured to track the positions and orientations of one or more phalanges of the user's hands 30. As illustrated in FIG. 3, the processor 12 may be configured to control the position, orientation, and movement of one or more virtual manipulators 34 based on the tracking of the user's hands 30. In one example, the one or more virtual manipulators 34 may include virtual phalanges that are also controlled based on the tracking of the user's hands 30. In other examples, the one or more virtual manipulators 34 may be controlled based on other types of input to the input system 18, such as, for example, controller input to a handheld controller, or input to a keyboard and mouse.

Turning back to FIG. 1, the processor 12 is configured to execute a virtual environment 38 that may take the form of a three-dimensional virtual scene and may include the one or more virtual manipulators 34 and one or more virtual objects 40. The virtual environment 38 may include a position-based physics engine 42 that calculates physical interactions between the one or more virtual manipulators 34 and the one or more virtual objects 40 based on position based energy minimizing functions 44 that will be described in more detail below.

The virtual environment 38 may include a virtual manipulator controller 46 that is configured to control the one or more virtual manipulators 34 based on input data 36 received from the input system 18 of the computer system 10. As discussed above, in one example, the input data 36 may include image data from the camera device 22 that captures images, such as RGB and depth images, of a user's hands. The virtual manipulator controller 46 may be configured to track a position of a user's hand via the input data 36, such as image data, received from the input system 18. The virtual manipulator controller 46 may be further configured to track the three-dimensional positions and orientations of one or more phalanges of the user's hands and determined a three-dimensional pose estimate for the user's hand. It should be appreciated that the virtual manipulator controller 46 may utilize any suitable type of human skeletal tracking processes and methods to track positions and orientations of the user's hands, phalanges of the user's hands, and other skeletal structures of the user's hands based on the image data captured by the camera device 22 of the input system 18.

As illustrated in FIG. 3, the one or more virtual manipulators 34 may take the form of a graphical representation of a hand. However, it should be appreciated that the one or more virtual manipulators 34 may take other suitable forms, such as, for example, grasping tools, claws, robotic arms, etc. The virtual manipulator controller 36 may be configured to control the graphical representation of the hand based on the tracked position of the user's hand.

In another example, the virtual manipulator controller 46 may be configured to control the one or more virtual manipulators 34 based on other types of input data 36 received by other types of input devices 24 of the input system 18. For example, the one or more virtual manipulators 34 may be controlled based on input data 36 to a handheld controller. As another example, the input data 36 may be received by a keyboard and mouse input device. However, it should be appreciated that the virtual manipulators 34 may be controlled via any suitable type of input data 36 and input device 24.

As illustrated in FIG. 1, the virtual manipulator controller 36 may control and move the one or more virtual manipulators 34 between various states 48 in the three-dimensional virtual environment 38. As used herein, the term "state" may be used to refer to a three-dimensional pose of the virtual manipulator and/or virtual object within the three-dimensional virtual environment. The three-dimensional pose may be determined with six degrees of freedom (6DoF), and may include the relative position and orientations of one or more parts/portions of the virtual manipulator and virtual object relative to one another and/or a coordinate system defined for the three-dimensional virtual environment. In one example, the virtual manipulators 34 may include one or more articulable portions 50 that may be controlled based on the input data 36. In hand tracking embodiments, the articulable portions 50 of the virtual manipulators 34 may be controlled based on the positions of corresponding phalanges of the user's hands tracked based on the image data received by the camera device 22. The virtual manipulator controller 46 may control the virtual manipulators 34 to move the virtual manipulators from an initial state 48A through subsequent states 48B, as will be discussed in more detail below.

The one or more virtual manipulators 34 may be configured to manipulate the one or more virtual objects 40 in the virtual environment 38 according to rules and logic of the physics engine 42 of the virtual environment 38. For example, the one or more virtual manipulators 34 may be configured to push, pull, grasp, move, rotate, resize, and otherwise manipulate the one or more virtual objects 40 in the virtual environment 38 as mediated by the physics engine 42. For example, the virtual manipulators 34 may be configured to grasp the virtual objects 40 and move the virtual objects 40 from an initial state of the virtual object 52A to a subsequent state of the virtual object 52B in the virtual environment 38.

The physics engine 42 may include a collision detection module 54 configured to detect contacts between the virtual manipulator 34 and surfaces of the one or more virtual objects 40. In one example, a contact between a portion of a virtual manipulator and a surface of a virtual object 40 may be detected based on determining that the portion of the virtual manipulator penetrates the surface of the virtual object. In another example, the contact may be determined based on detecting that the portion of the virtual manipulator, such as, for example, a contact point on the virtual manipulator, is within a threshold distance of a surface of the virtual object. It should be appreciated that other types of collision detection processes and techniques may be used by the collision detection module 54 to detect contacts between virtual manipulators and virtual objects.

The virtual environment 38 including the virtual manipulators 34 and the virtual objects 40 may be displayed via the display device 20. As the virtual manipulators 34 and virtual objects 40 are moved from an initial system state to a subsequent system state in the virtual environment 38, updated frames for the virtual environment 38 may be rendered and displayed to the user via the display device 20. In augmented reality HMD device configurations, the virtual environment 38 may be displayed on top of the real world environment via a see-through near-eye display.

Figure 4:
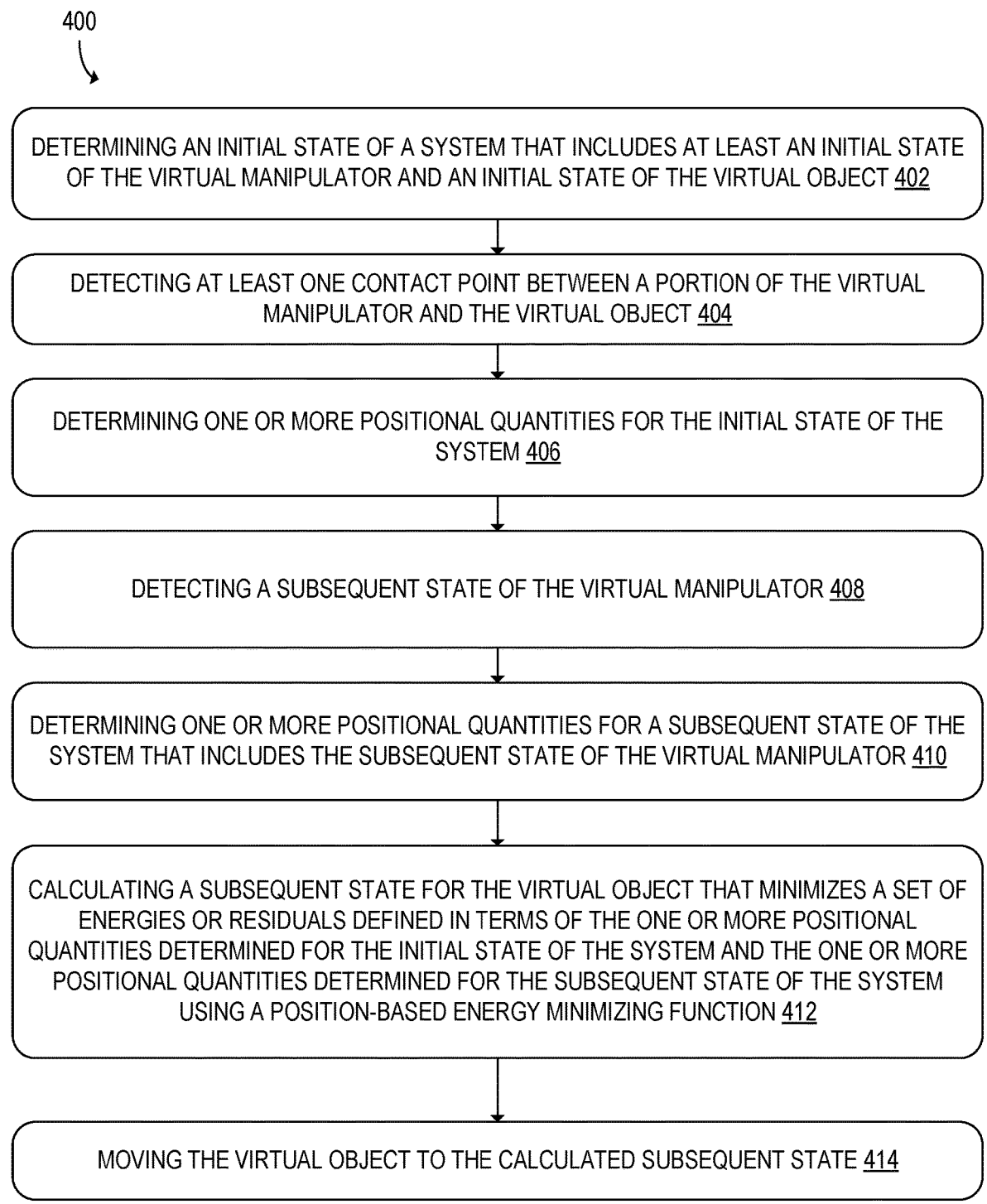
FIG. 4 shows a flowchart for an example method of manipulating virtual objects with virtual manipulators using position based energy minimizing functions.

FIG. 4 illustrates an example computer-implemented method 400 for calculating a subsequent state 52B for a virtual object 40 according to a position based energy minimizing functions 44 of the physics engine 42. At 402, the method 400 may include determining an initial state of a system 41 that includes at least an initial state 48A of the virtual manipulator 34 and an initial state 52A of the virtual object 40. As illustrated with reference to FIG. 5A, the virtual manipulator 34 has an initial state 48A, and the virtual object 40 has an initial state 52A. As used herein, term "system" may be used to refer to a set of states of the virtual manipulators 34, virtual objects 40, and contact points between the virtual manipulators and virtual objects at a particular point in time of the virtual environment, as illustrated in FIG. 1.

At 404, the method 400 may include detecting at least one contact point 56 between a portion 58 of the virtual manipulator 34 and the virtual object 40. As illustrated with reference to FIG. 5A, the collision detection module 54 detects contact between the portion 58 of the virtual manipulator 34 and a surface of the virtual object 40. In the illustrated example, the portion 58 is a pointer finger of the virtual manipulator taking the form of a graphical representation of a hand. However, it should be appreciated that the portion 58 may take other forms, such as, for example, two or more phalanges of the graphical representation of the hand, claws on a robot representation of the virtual manipulator, etc. As discussed above, the contact 56 may be detected via a variety of collision and penetration techniques, such as, for example, detecting the contact point 56 based on detecting a penetration of the portion 58 of the virtual manipulator 34 into a surface of the virtual object 40.

At 406, the method 400 may include determining one or more positional quantities for the initial state of the system 41. The one or more positional quantities may be determined for one or more of the virtual manipulator 34, the virtual object 50, and the at least one contact point 56 between the portion 58 of the virtual manipulator 34 and the virtual object 50 at the initial state of the system 41. In one example, the one or more positional quantities may include a frame of reference of the virtual manipulator, a frame of reference of the virtual object, a scaling frame of reference, a position of the contact point, a normal of the contact point, a penetration depth of the contact point, and other suitable types of positional quantities. In one example, the positional quantities may include a contact point tangent component for friction, which will be discussed in more detail below.

As illustrated with reference to FIG. 5A, the one or more positional quantities may include a position P1 of the contact point 56 relative to the portion 58 of the virtual manipulator 34 and the virtual object 50 that may be calculated by the processor. In one example, the position P1 may indicate a degree of penetration of a point on the portion 58 of the virtual manipulator 34 into the geometry of the virtual object 40. The physics engine 42 may also calculate a normal 60 for the contact point 56 between the portion 58 of the virtual manipulator 34 and the virtual object 50 as one of the positional quantities. In one example, the normal 60 may be calculated based on a geometry of the surface of the virtual object 40 at the point of contact. In another example, the normal 60 may be calculated based on an idealized geometric representation of the virtual object 40, such as, for example, a sphere, that is positioned at the point of contact 56. Other techniques and methods for calculating the normal 60 will be described herein.

At 408, the method 400 may include detecting a subsequent state 48B of the virtual manipulator 34. As illustrated with reference to FIG. 5B, new input data has been received that moves the virtual manipulator 34 from the initial state 48A to the subsequent state 48B. The processor 12 may then be configured to compute a subsequent state of the system 41 that includes the subsequent state of the virtual manipulator 48B.

In typical physics engines, in order to calculate how the movement of the virtual manipulator 34 would affect the virtual object 40, these typical physics engines would calculate a force or impulse applied by the virtual manipulator to the virtual object 40 over a period of time. These typical physics engines would also need to calculate other potential forces, such as, for example, friction between the virtual manipulator and virtual object, mass of the virtual object, etc. However, due to the complexity of these types of force calculations, simulation errors and processing resource consumptions required to simulate the impulse based physics may potentially increase, as discussed above.

Method 400 uses energy minimizing position based dynamics techniques described herein to calculate how the virtual manipulator 34 will affect the virtual object 40. At 410, the method 400 may include determining one or more positional quantities for a subsequent state of the system 41 that includes the subsequent state 48B of the virtual manipulator 34. Step 410 may include updating and/or transforming one or more positional quantities of the system 41, such as, for example, the position and normal 60 for the at least one contact point 56 based on the subsequent state of the virtual manipulator 48B in the subsequent state of the system 41. As illustrated with reference to FIG. 5B, the position and normal 60 for the contact point 56 have been transformed and/or updated based on the subsequent state of the system 41 including the subsequent state 48B of the virtual manipulator 34. Specifically, in this example, the position and normal 60 have been translated a distance D1 based on the difference between the initial and subsequent states of the virtual manipulator 34.

At 412, the method 400 may include calculating a subsequent state 52B for the virtual object 40 that minimizes a set of energies or residuals defined in terms of the one or more positional quantities determined for the initial state of the system 41 and the one or more positional quantities determined for the subsequent state of the system 41 using a position-based energy minimizing function 44. As illustrated with reference to FIG. 5B, the position and normal of the contact point 56 have been transformed/updated to the position P2 and normal 60T. In this specific example, the virtual manipulator 34 has only been translated a distance D1 to the right along a linear path. Thus, when transforming/updating the position and normal of the contact point 56, the position was also translated the distance D1. The orientation of the virtual manipulator 34 did not change from the initial to subsequent position, thus the orientation of the normal 60 also did not change. Thus, the processor 12 may calculate the subsequent state 52B of the virtual object 40 to minimize the set of energies or residuals, such as, for example, the residual for the distance D1 that indicates the disparity between the position P1 and the transformed position P2 for the contact point 56.

It should be appreciated that the example set of energies or residuals shown in FIGS. 5A and 5B are merely illustrative, and that the position based energy minimizing function may be configured to minimize other types of energies and residuals defined in terms of other types of positional quantities. For example, the minimized energies or residuals may include a kinetic energy defined by a difference of virtual object positions between the initial and subsequent states of the system 41. As another example, the minimized energies or residuals may include a penetration depth residual defined by a calculated depth of a penetration of the portion of the virtual manipulator 34 into the virtual object 40 at the subsequent state of the system 41. As yet another example, the minimized energies or residuals may include a tangential friction residual defined by a difference between two positional quantities at the subsequent state of the system 41 (e.g. a position of the transformed contact point on the virtual manipulator given a manipulator transform from the initial state to the subsequent state, minus a position of the transformed contact point on the virtual object given an object transform from the initial state to the subsequent state). As yet another example, the minimized energies or residuals may include an angular friction residual defined by a difference between two positional quantities at the subsequent state of the system 41. It should be appreciated that other types of energies and residuals not specifically mentioned above may be minimized by the position based energy minimizing functions 44.

At 414, the method 400 may include moving the virtual object 40 to the calculated subsequent state 52B. The virtual manipulator 34 and the virtual object 40 may then be displayed to the user via the display 20. It should be appreciated that the virtual object 40 was moved to the subsequent state 52B based on the positional quantities of the initial and subsequent states of the system 41, and did not require computing impulse and force calculations as in typical physics engines.

FIG. 6 illustrates an example computer implemented method 600 for calculating the subsequent state of the virtual object 40 based on one or more positional quantities that include a frame of reference of the virtual manipulator. At 602, the method 600 may include, based on detecting the at least one contact point 56 between the portion 58 of the virtual manipulator 34 and the virtual object 40, determining a relative state of the virtual object 40 compared to the frame of reference of the virtual manipulator 34 centered at a reference point on the virtual manipulator. As illustrated with reference to FIG. 7A, the virtual manipulator 34 has an initial state 48A and the virtual object 40 has an initial state 52A in the initial state of the system 41 of the virtual environment. Based on these positions, the processor 12 detects two contact points 56A and 56B between two portions 58A and 58B of the virtual manipulator 34 according to any of the techniques described herein. Based on the detected contact points, the processor 12 may determine that the user is intending to grasp the virtual object 40. The processor 12 may then be configured to determine a relative state of the virtual object 40 to a frame of reference centered at a reference point 64 on the virtual manipulator 34. In the illustrated example, the relative state of the virtual object 40 is indicated by the vector V1. In one example, the reference point 64 is a point on a palm of the virtual manipulator 34. However, it should be appreciated that the reference point 64 may be set at other suitable points on the virtual manipulator, such as a wrist, a finger, etc.

At 604, the method 600 may include calculating the subsequent state 52B for the virtual object 40 that minimizes an energy or residual defined in terms of the relative state (denoted by vector V1) of the virtual object 40 compared to the frame of reference of the virtual manipulator 34 for the initial state of the system 41 and the relative state of the virtual object 40 compared to the frame of reference of the virtual manipulator 34 for the subsequent state of the system 41. As illustrated with reference to FIG. 7B, the virtual manipulator 34 has moved to a subsequent state 48B. The processor 12 may be configured to transform and/or update the relative state of the virtual object 40 based on the subsequent state of the virtual manipulator 34. The transformed relative state is illustrated as the vector V2 in FIG. 7B. Next, the processor 12 may be configured to calculate a subsequent state 52B for the virtual object 40 that minimizes a set of residuals, such as the angle A, defined in terms of a disparity between the initial relative state and the transformed relative state.

In this manner, the virtual object 40 is attached to the reference point 64 of the virtual manipulator 34 such that transformations applied to the virtual manipulator 34 are also correspondingly applied to the virtual object 40 so that the virtual object 40 appears to remain grasped by the virtual manipulator 34 while moving through the virtual environment.

In order to ungrasp the virtual object and detach the virtual object 40 from the virtual manipulator 34, the processor may be configured to detect that the one or more portions 58A and 58B are no longer contacting a surface of the virtual object 40. Upon detecting that the one or more portions 58A and 58B are no longer contacting the virtual object 40, the processor may be configured to stop tracking the relative position of the virtual object 40 to the reference point 64 so that transformation applied to the virtual manipulator are no longer also applied to the virtual object 40.

In one example, the contact points 56 between the virtual manipulator 34 and the virtual object 40 may be detected based on a point of overlap between the portion 58 of the virtual manipulator and the virtual object 40. In this example, the positions and normals for these contact points 56 may be calculated based on surface geometry of the portion 58 of the virtual manipulator 34 and surface geometry of the virtual object 40. Other techniques for calculating the positions and normal for these contact points 56 are described herein.

Figure 7B:
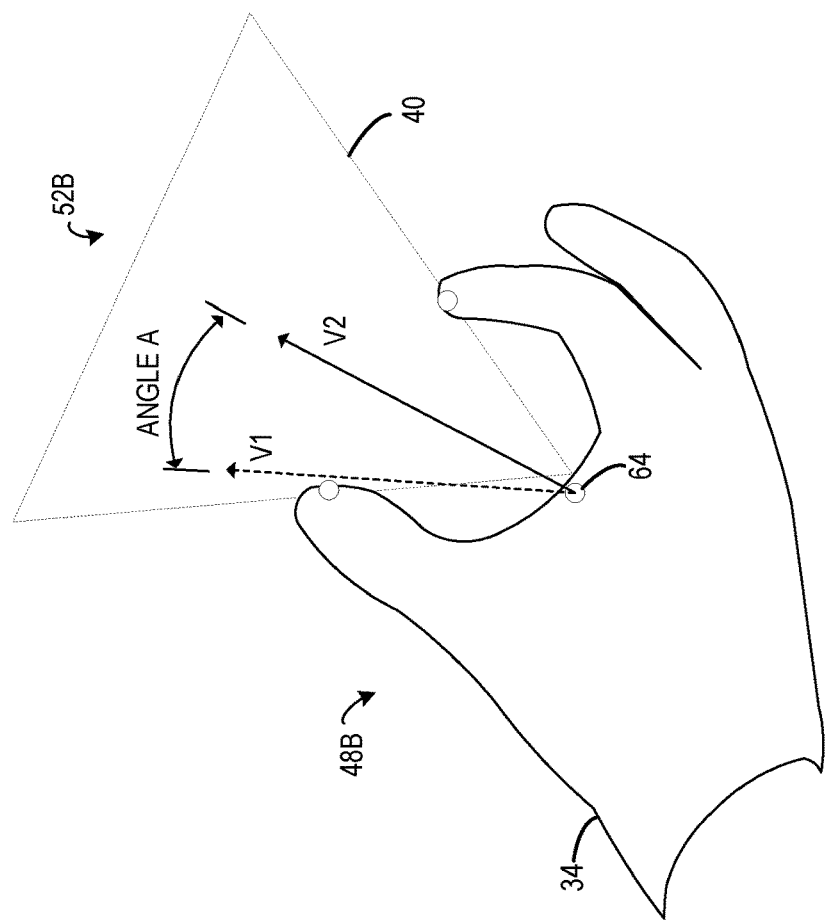
FIG. 7B shows an example virtual manipulator grasping and moving a virtual object with two articulable portions in the virtual environment executed by the computer system of FIG. 1.
Figure 7A:
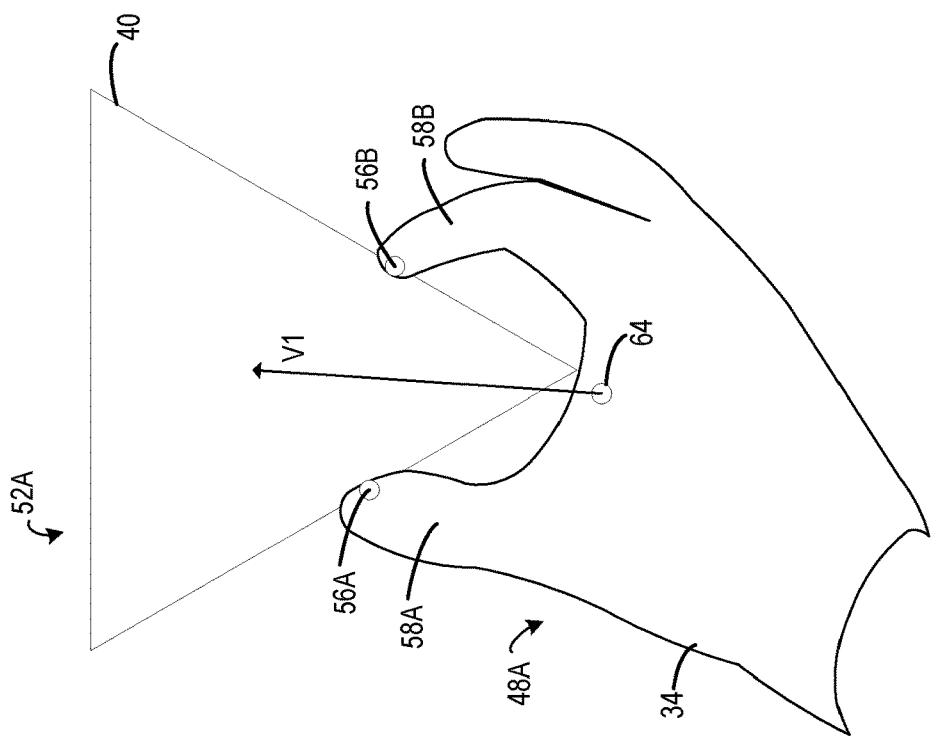
FIG. 7A shows an example virtual manipulator grasping a virtual object with two articulable portions in the virtual environment executed by the computer system of FIG. 1.

In the example illustrated in FIG. 7A, the processor may be configured to detect contact points 56 for each portion of the virtual manipulator 34 that is contacting the virtual object. In examples where the virtual manipulator 34 is a graphical representation of a hand, such as in FIG. 7A, the first and second portions 58A and 58B may take the form of a first articulable portion and a second articulable portion, such as a finger and a thumb. The processor 12 may be configured to detect at least two contact points including a first contact point 56A between the first articulable portion 58A and the virtual object 40 and a second contact point 56B between the second articulable portion 58B and the virtual object 40. The processor 12 may be configured to perform the techniques described in method 400 and and/or method 600 using both the first contact point 56A and the second contact point 56B. In some examples, the virtual manipulator may include more than two articulable portions. For example, the graphical representation of the hand may include an articulable portion for each thumb and finger, and the processor 12 may be configured to detect contact points between each of these articulable portions and the virtual object 40.

Figure 9B:
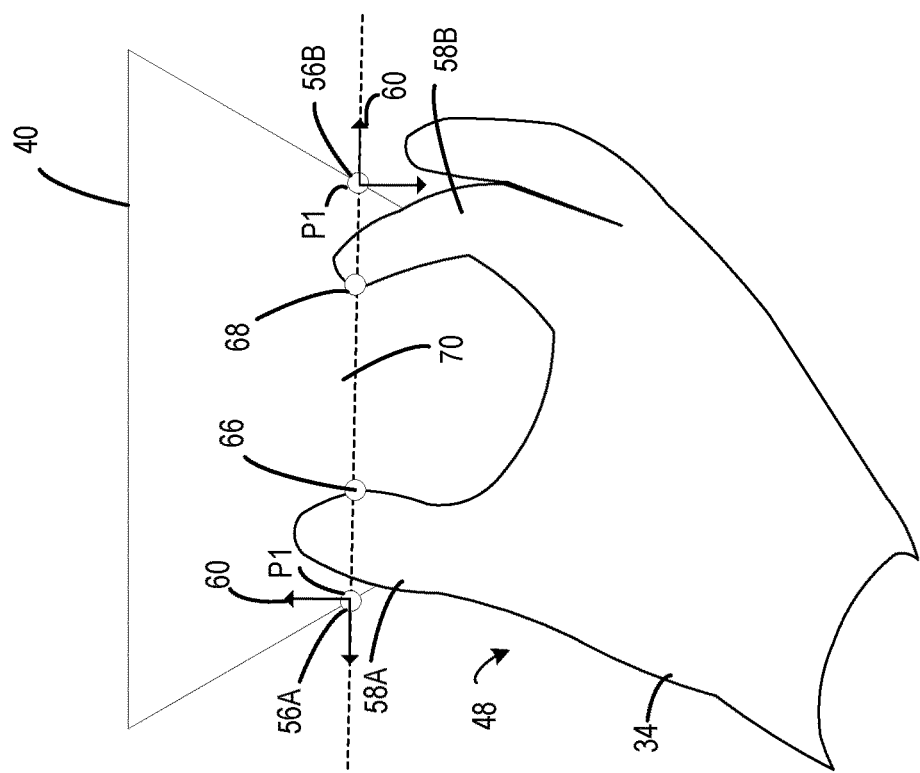
FIG. 9B shows an example of detecting contact points based on an intersection between the line and a surface of the virtual object in the virtual environment executed by the computer system of FIG. 1.
Figure 9A:
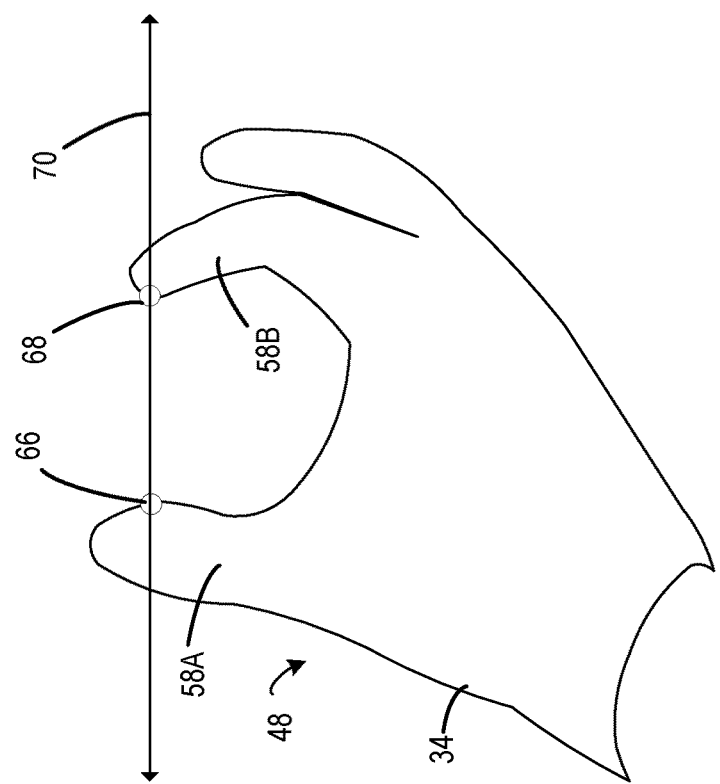
FIG. 9A shows an example line that extends between and outward from two closest points on a virtual manipulator in the virtual environment executed by the computer system of FIG. 1.

It should be appreciated that other techniques may be used to calculate contact points and normals at those contact points. For example, FIG. 8 illustrates an example method 800 for calculating contact points and normals for a virtual object being grasped between two articulable portions having opposing normals. As illustrated with reference to FIG. 9A, the virtual manipulator includes at least the first articulable portion 58A and the second articulable portion 58B. In this example, the first articulable portion 58A is a thumb of a graphical representation of a hand, and the second articulable portion 58B is a pointer finger of the graphical representation of the hand. The first and second articulable portions may include fingertips having a substantially convex shape. Thus, articulable portions that face toward each other, such as between a thumb articulable portion and each of the four finger articulable portions, may be determined to have opposing normals.

At 802, the method 800 may include determining a closest point 66 on the first articulable portion 58A relative to the second articulable portion 58B. At 804, the method 800 may include determining a closest point 68 on the second articulable portion 58B relative to the first articulable portion 58A. As illustrated with reference to FIG. 9A, the processor 12 may determine the closest points 66 and 68 based on the states 48 of the virtual manipulator 34 and its articulable portions 58A and 58B. That is, the processor 12 may determine a point on the mesh or other collision geometry of the first articulable portion 58A that minimizes a distance to the surface of the mesh of the second articulable portion 58B, and vice versa. It should be appreciated that when the surfaces of the mesh of the first and second articulable portions 58A and 58B are substantially convex or concave, the closest points on the convex or concave mesh/collision geometry will have opposing normals.

At 806, the method 800 may include determining a line 70 that intersects the closest point 66 on the first articulable portion 58A and the closest point 68 on the second articulable portion 58B and extends outward from the closest points. In one example, determining the line 70 may further include casting a ray in both directions along the line. As illustrated with reference to FIG. 9A, the line 70 intersects both closest points 66 and 68. The line may extend outwards from the virtual manipulator 34 for any suitable distance.

At 808, the method 800 may include detecting at least two points on the surface of the virtual object 40 that intersect the line 70 as being the at least two contact points 56A and 56B. In the example illustrated in FIG. 9B, the processor 12 may be configured to determine that the first articulable portion 58A and the second articulable portion 58B are penetrating the virtual object 40. Rather than determining the contact points based on an overlap between the articulable portions and the virtual object 40, the processor 12 may be configured to identify at least two points on the surface of the virtual object 40 that intersect the line 70, and set those two points as the at least two contact points 56A and 56B. In one example, to detect the at least two points, the processor 12 may be configured to cast a ray for each closest point along the line 70 from a negative distance, such as −10 cm. However, it should be appreciated that any suitable distance may be used. In another example, the ray may be cast backwards along the line 70 from the opposing closest point on the other articulable portion, and the contact point may be detected based on detecting penetration of the ray with a back face of the virtual object 40.

At 810, the method 800 may include determining the positions P1 for the at least two contact points 56A and 56B based on the intersections between the line 70 and the surface of the virtual object 40. As illustrated with reference to FIG. 9B, the positions P1 of the contact points 56A and 56B are located at an interaction between the line 70, which may be cast outwards from the virtual manipulator 34, and the outside surface of the virtual object 40, and not at a location of an intersection between a surface of the virtual manipulator 34 and the virtual object 40. By determining contact points in this manner, the method 800 provides the potential benefit of performing grasping calculations that are robust to deep penetrations. That is, the method 800 can calculate usable contact points for grasping and moving the virtual object even if the virtual manipulator 34 is moved to deeply penetrate the surfaces of the virtual object 40.

At 812, the method 800 may include determining the normal 60 for the at least two contact points 56A and 56B to be parallel to the line 70. As illustrated with reference to FIG. 9B, rather than calculating the normal 60 for the at least two contact points based on a geometry of the surface of the virtual object 40 at the contact points 56A and 56B, the processor 12 may be configured to set the normals 60 to be parallel to the line 70. These positions and normals 60 for the at least two contact points 56A and 56B may be transformed and/or updated in the same manner as described above in method 400 with reference to FIGS. 5A and 5B. It should be appreciated that the techniques described in method 800 provides the potential benefit of allowing interaction between the virtual manipulators and a concave virtual object without having to approximate the concave virtual object by a convex decomposition.

Figure 10B:
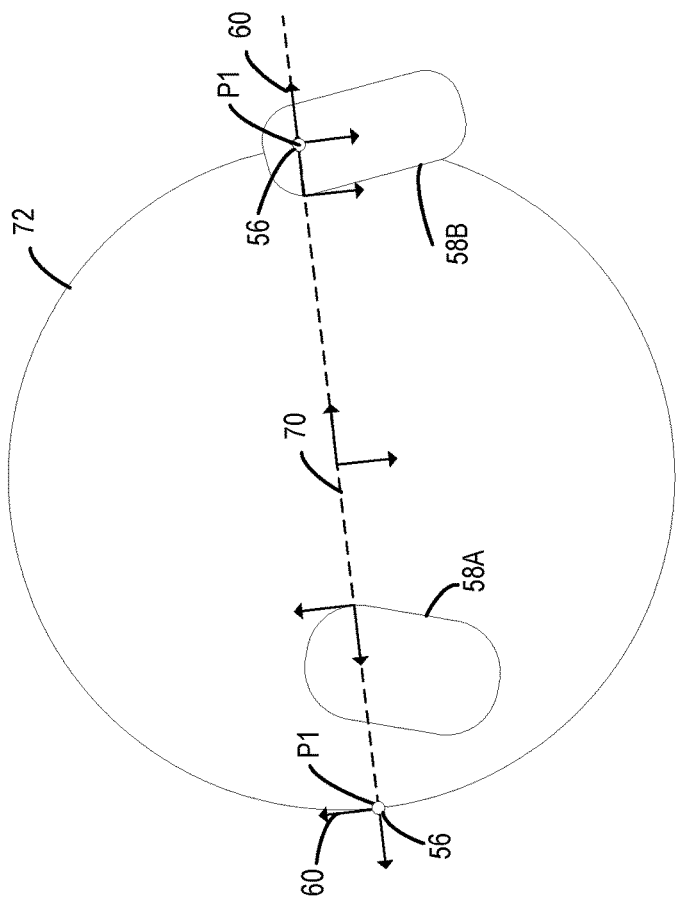
FIG. 10B shows an example of determining one or more positional quantities for an initial state of a system in the virtual environment executed by the computer system of FIG. 1.
Figure 10A:
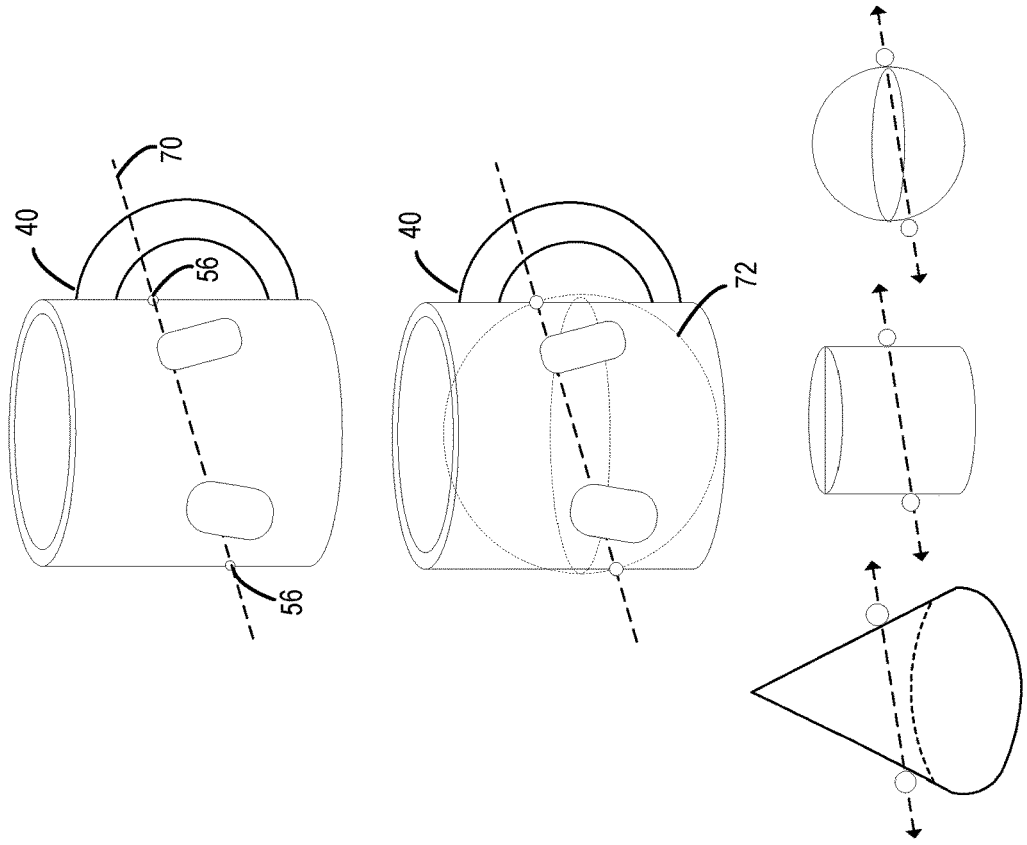
FIG. 10A show an example of a simplified geometric representation of a virtual object in the virtual environment executed by the computer system of FIG. 1.
Figure 11:
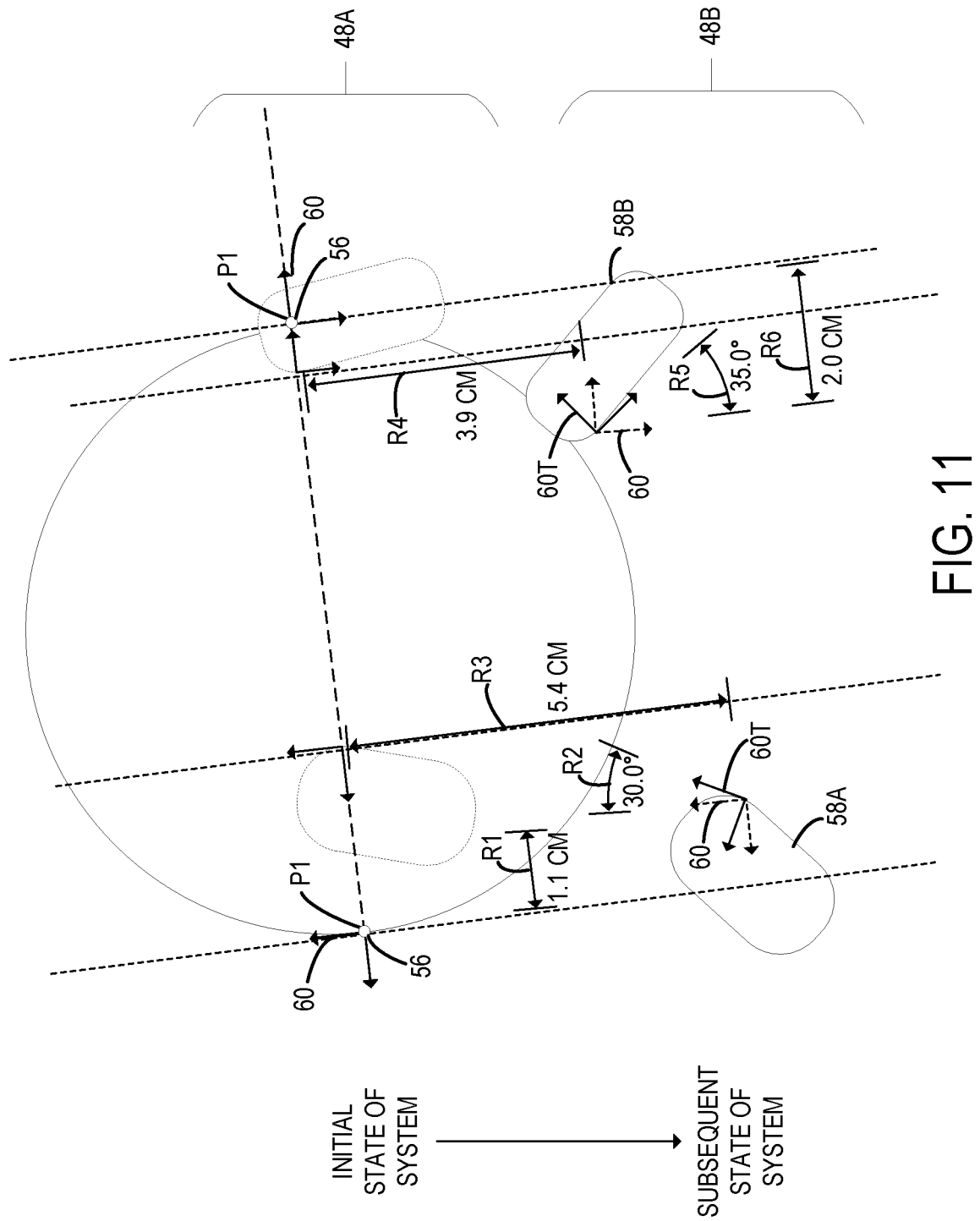
FIG. 11 shows an example of a set of energies or residuals resulting from moving the virtual manipulator of FIG. 10B to a subsequent state in the virtual environment executed of the computer system of FIG. 1.

At 814, the method may include calculating the subsequent state 52B for the virtual object 40 that minimizes an energy or residual defined in terms of the one or more normals 60 for the at least two contact points 56A and 56B determined for the initial state of the system 41 and the one or more normal 60 for the at least two contact points 56A and 56B determined for the subsequent state of the system 41 using the position-based energy minimizing function 44. The subsequent state 52B for the virtual object 40 may be calculated using similar processes and techniques described above in method 400 with reference to FIGS. 5A and 5B. FIGS. 10A, 10B, and 11 illustrate another example for calculating the target position 52B for the virtual object 40 that minimizes the set of residuals defined by positional quantities for at least two contact points.

In one example, the processor 12 may be configured to use method 800 when determining whether the user intends to grasp the virtual object 40 when implementing method 600. For example, the processor 12 may be configured to determine that the user is intending to grasp the virtual object 40 when a pair of articulable portions of the virtual manipulator having opposing normals (e.g. Thumb portion paired with each finger portion) are penetrating the virtual object 40 as determined by firing rays in both directions along the line 70 determined in method 800. If any opposing pair of articulable portions of the virtual manipulator are penetrating the virtual object 40, the processor 12 may attach the virtual object 40 to the reference frame of the virtual manipulator as described in method 600. If, in subsequent states, none of the opposing pairs of articulable portions of the virtual manipulator are detected to be penetrating the virtual object 40, then the processor 12 may be configured to detach the virtual object 40 from the virtual manipulator 34.

In one example, the processor 12 may be configured to simplify the geometry of the virtual objects 40 when performing the processes and techniques for position based energy minimizing physics simulations described herein. For example, as illustrated in FIG. 10A, the processor 12 may be configured to detect the at least two contact points 56 on the surface of the geometry of the virtual object 40. Next, the processor 12 may be configured to generate a simplified geometric representation 72 of the virtual object 40 based on the positions for the at least two contact points 56 that were determined based on the intersections between the line 70 and the surface of the virtual object 40. In the illustrated example, the processor 12 generated a sphere as the simplified geometric representation 72 to represent the virtual object 40 shown in the examples of FIGS. 5A and 5B. However, it should be appreciated that the processor 12 may be configured to generate other types of idealized geometry to represent the virtual objects 40. For example, the simplified geometric representation 72 may take the form of a rectangular box, a cylinder, a cone, or another idealized geometric shape that has fewer indices and vertices than the mesh of the virtual object 40. The processor 12 may be configured to perform all of the techniques and functions described herein on the simplified geometric representation 72, and then correspondingly apply any movements or transformations calculated for the simplified geometric representation 72 to the virtual object 40.

FIG. 10B illustrates a schematic view for illustrative purposes of at least two portions 58A and 58B penetrating the surface of the simplified geometric representation 72 that was generated for the virtual object 40. Implementing the method 800, the processor 12 may be configured to determine the closest points on the first articulable portion 58A and the second articulable portion 58B, and determine the line 70 between those two points. Next, the processor 12 may identify contact points between the line 70 and the surface of the virtual object 40, and may generate the simplified geometric representation 72 based on the contact points. That is, the simplified geometric representation 72 is dynamically defined by the positions of the contact points determined via ray casts along the line 70, rather than being approximated as part of a preprocessing step of the virtual object 40 as is typical in prior approaches. FIG. 10A illustrates an example of a cone simplified geometric representation, a cylinder simplified geometric representation, and a sphere simplified geometric representation that have each been dynamically defined by the positions of the contact points along the ray.

The processor 12 may be configured to determine one or more positional quantities for the contact points, such as, for example, the position P1 and the normal 60 for the at least one contact point 56 between the portion 58A and 58B of the virtual manipulator 34 and a surface of the simplified geometric representation 72 of the virtual object 40. These contact points, positions, and normals 60 may then be processed and transformed/updated according to the steps of method 400 and method 800 to calculate a subsequent state for the virtual object 40, as will be described in more detail below regarding FIG. 11.

FIG. 11 continues the example illustrated at FIG. 10B. In this example, the virtual manipulator 34 has moved to a subsequent state 48B. Additionally, the first articulable portion 58A and the second articulable portion 58B have moved to different positions relative to each other at the subsequent state 48B. The processor 12 may then transform and/or update the one or more positional quantities, such as the positions and normals of the contact points, based on the subsequent state 48B of the virtual manipulator. FIG. 11 shows a comparison of the initial normal 60 and the transformed normal 60T. As shown, there are a set of energies or residuals R1, R2, R3, R4, R5, and R6, that may be defined based on differences between the one or more positional quantities of the contact points between the initial and subsequent positions. However, as discussed above, the set of energies or residuals may include energies or residuals that are defined based on differences between positional quantities of the subsequent state of the system 41, and are not defined based on a difference between the initial state the subsequent state of the system 41.

The processor 12 may then calculate the subsequent state for the simplified geometric representation 72 that minimizes the set of residuals R1, R2, R3, R4, R5, and R6. In some examples, due to the change in position of the two articulable portions 58A and 58B relative to one another, not all of the residuals may necessarily be reduced to zero. However, the set of energies and/or residuals as a whole may be minimized using the position based energy minimizing function 44 for the physics engine 42. After calculating the subsequent state for the simplified geometric representation 72, a corresponding transformation and/or translation may be applied to the virtual object 40.

Figure 12:
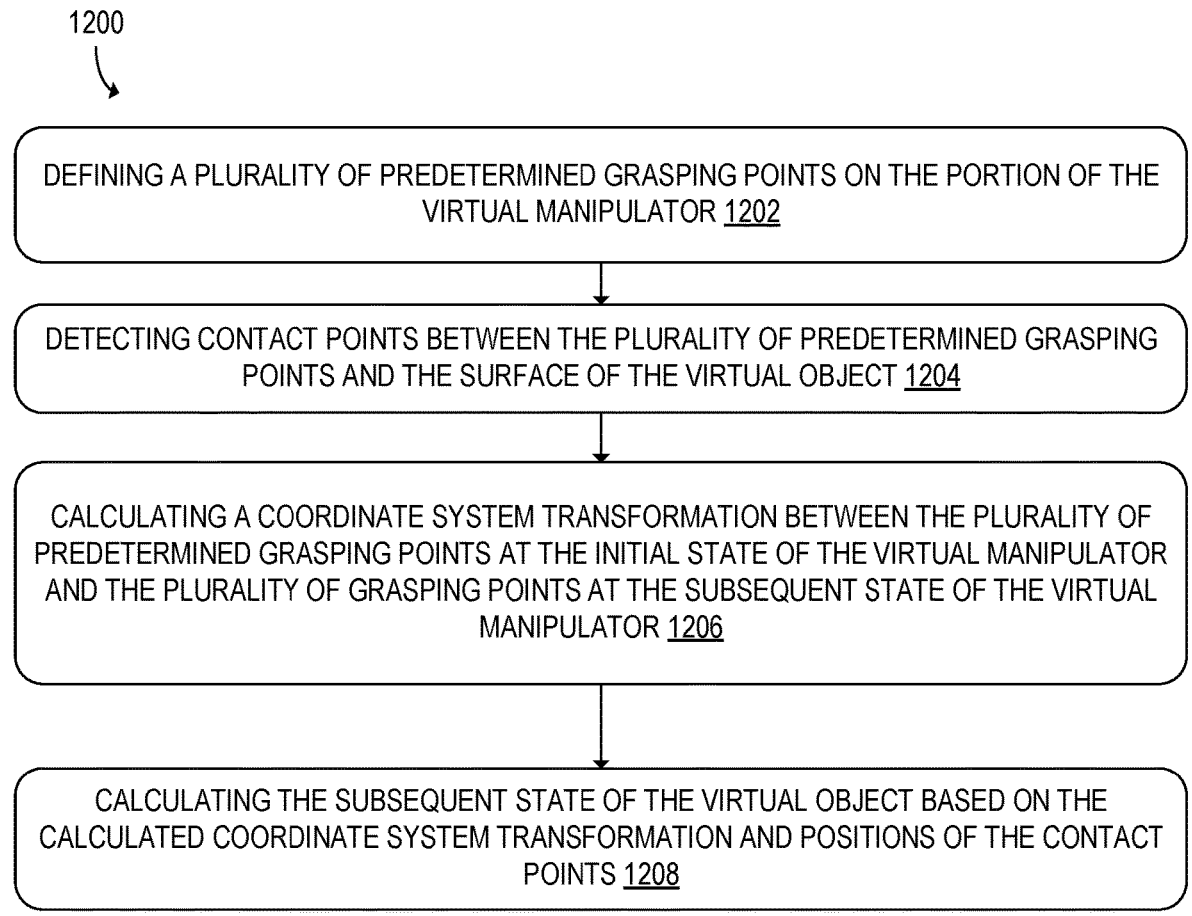
FIG. 12 shows a flowchart of a method for manipulating a virtual object using a plurality of predetermined grasping points on a virtual manipulator in the virtual environment executed by the computer system of FIG. 1.
Figure 13B:
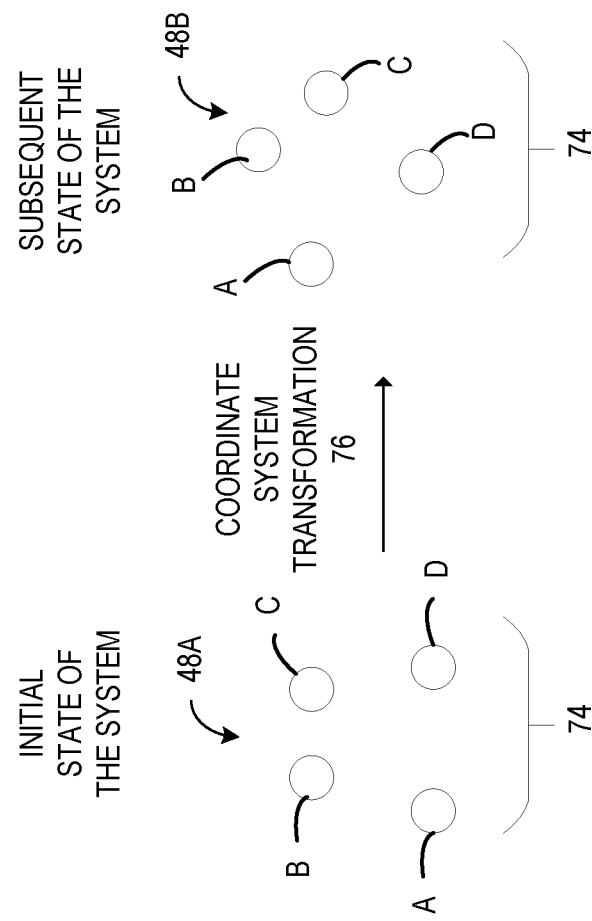
FIG. 13B shows an example coordinate system transformation for the plurality of grasping points in the virtual environment executed by the computer system of FIG. 1.
Figure 13A:
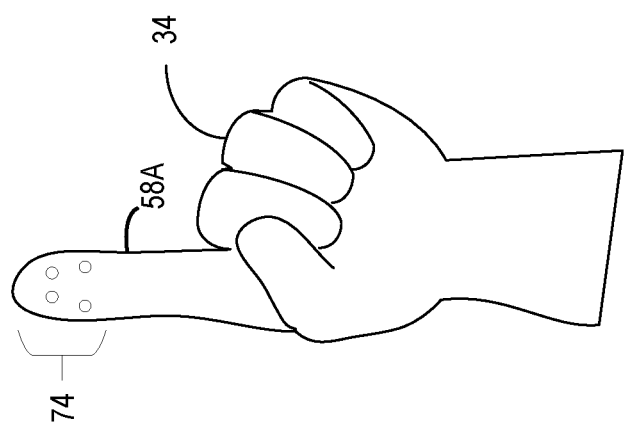
FIG. 13A shows an example of the plurality of grasping points fixed on a virtual manipulator in the virtual environment executed by the computer system of FIG. 1.

FIG. 12 illustrates another example method 1200 for detecting contact points between a virtual manipulator and a virtual object. At 1202, the method 1200 may include defining a plurality of predetermined grasping points 74 on the portion 58A of the virtual manipulator 34. As illustrated with reference to FIG. 13A, the plurality of predetermined grasping points 74 may include any suitable number of grasping points 74, such as, for example, 2, 3, 4, 5, etc. These grasping points 74 are predetermined and fixed to the portion 58A of the virtual manipulator. It should be appreciated that in examples where the virtual manipulator 34 includes a plurality of articulable portions, that each articulable portion may have separate defined and fixed pluralities of predetermined grasping points 74. These grasping points may, for example, be selected from vertices of the mesh of the virtual manipulator 34. In another example, these grasping points are defined points have positions relative to the virtual manipulator 34.

At 1204, the method 1200 may include detecting contact points between the plurality of predetermined grasping points 74 and the surface of the virtual object 30. In one example, the processor 12 may be configured to detect these contact points based on detecting a penetration of the plurality of predetermined grasping points 74 into or near a surface of the virtual object 40. In another example, the contact points may be detected based on detecting that the plurality of predetermined grasping points 74 are positioned within a threshold distance of a surface of the virtual object.

After the processor 12 has detected the contact points and recognized that the user is attempting the grasp the virtual object 40, the method 1200 may proceed to 1206. At 1206, the method 1200 may include calculating a coordinate system transformation 76 between the plurality of predetermined grasping points 74 at the initial state 48A of the virtual manipulator 34 and the plurality of grasping points 74 at the subsequent state 48B of the virtual manipulator 34. That is, as the user controls the virtual manipulator 34 and changes its position, because the plurality of grasping points 74 are fixed to the virtual manipulator, the relative position of the plurality of grasping points 74 will also correspondingly change. As illustrated with reference to FIG. 13B, by comparing the positions of the plurality of grasping points 74 at the initial and subsequent states, the processor 12 may calculate a coordinate system transformation 76 that may be applied to the grasped virtual object 40. It should be appreciated that the coordinate system transformation 76 may be calculated via any suitable technique, such as, for example, the Closed-form solution of absolute orientation using unit quaternions by Berthold K. P. Horn.

At 1208, the method 1200 may include calculating the subsequent state 52B of the virtual object 40 based on the calculated coordinate system transformation 76 and positions of the contact points. The virtual object 40 may then be moved to the subsequent state 52B and displayed to the user via the display 20.

In the previous examples, the computer system 10 controls one virtual manipulator 34 based on the input data 36. However, it should be appreciated that the computer system 10 may control more than one virtual manipulator, and that the techniques and methods described herein are also applicable grasping a virtual object 40 with two virtual manipulators 34.

FIG. 14 illustrates an example method for grasping a virtual object 40 using at least two virtual manipulators 34. At 1402, the method 1400 may include controlling at least two virtual manipulators 34 based on input data 36 received from the input system 18. In one example, each virtual manipulator 34 may respectively include at least a first articulable portion 58A and a second articulable portion 58B, as illustrated in the examples of FIGS. 7A and 7B. For example, both of the user's hands may be tracked via images captured by the camera device 22, and two virtual manipulators may be controlled based on the tracked hands of the user.

At 1404, the method 1400 may include detecting at least two pairs of contact points 78 including a first pair of contact points 78A between a first virtual manipulator 34A and the virtual object 40 and a second pair of contact points 78B between a second virtual manipulator 34B and the virtual object 40. As illustrated with reference to FIG. 15A, two virtual manipulators 34A and 34B may grasp the virtual object 40 with at least two articulable portions. The pairs of contact points 78 for the grasping may be detected via the techniques described in methods 400 and 800.

At 1406, the method 1400 may include determining one or more positional quantities for the initial state of the system 41 that includes at least initial states 48A for the at least two virtual manipulators 34, the initial state 52A for the virtual object 40, and an initial state for the first pair of contact points 78A and second pair of contact points 78B. These positional quantities may include all of the positional quantities discussed above.

At 1408, the method 1400 may include detecting subsequent states 48B of the at least two virtual manipulators 34. As illustrated with reference to FIG. 15B, the two virtual manipulators may be controlled to move to the respective subsequent states 48B.

At 1410, the method 1400 may include determining one or more positional quantities for the subsequent state of the system 41. The subsequent state of the system 41 may include the subsequent states 48B of the at least two virtual manipulators 34. The one or more positional quantities for the subsequent state of the system 41 may be determined by transforming and/or updating one or more positional quantities determined for the initial state of the system 41, such as, for example, the positions and normals 60 for the at least two pairs of contact points 78A and 78B. Other positional quantities of the subsequent state of the system 41 that are not dependent upon the initial state of the system 41 may also be determined. In one example, each pair of contact points 78A and 78B may be separately processed according to the techniques described in method 400. Thus, each contact point of the at least two pairs of contact points 78A and 78B will have an initial position and normal 60, and a transformed position and normal 60 that may be used to define one or more energies or residuals that will be minimized by the position based energy minimizing functions.

At 1412, the method 1400 may include calculating the subsequent state 52B for the virtual object 40 that minimizes the set of energies or residuals defined in terms of the one or more positional quantities determined for the initial state of the system 41 and the one or more positional quantities determined for the subsequent state of the system 41 using the position-based energy minimizing function 44. The combined set of energies and/or residuals for all of the contact points may be minimized as a whole using the position-based energy minimizing function 44 and the techniques described herein. The virtual object 40 may then be moved to the subsequent state 52B and displayed to the user via the display 20.

Figure 16:
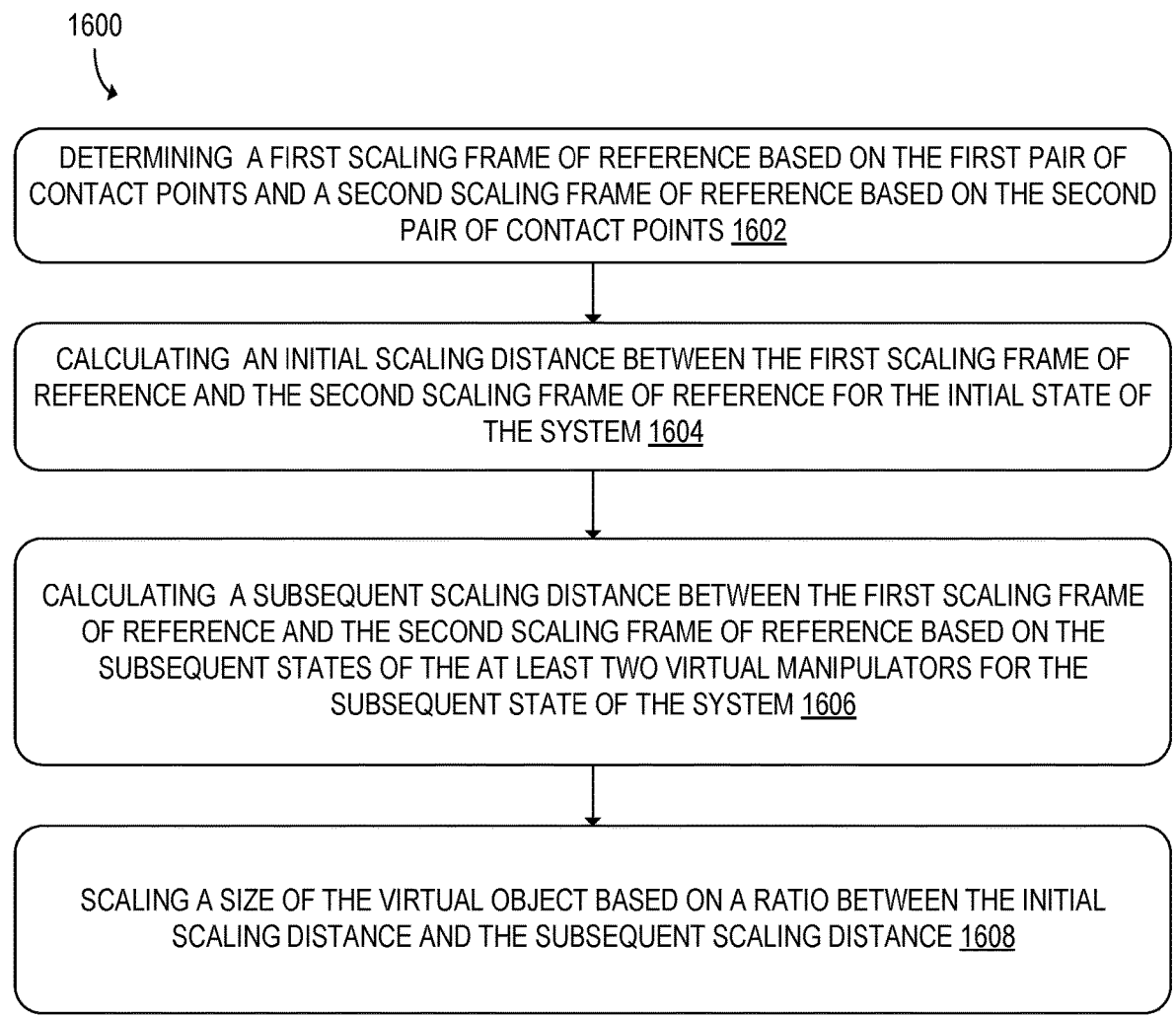
FIG. 16 shows a flowchart of a method for scaling a virtual object using two virtual manipulators in the virtual environment executed by the computer system of FIG. 1.

In one example, the two virtual manipulators 34A and 34B may be controlled to be moved a distance away from each other. FIG. 16 illustrates an example method 1600 for resizing the virtual object 40 based on the changing states of the two virtual manipulators 34A and 34B. In these examples, the one or more positional quantities may include scaling frames of reference that are determined for each pair of contact points. At 1602, the method 1600 may include determining a first scaling frame of reference 80A based on the first pair of contact points 78A and a second scaling frame of reference 80B based on the second pair of contact points 78B. As illustrated with reference to FIG. 17A, the processor 12 may be configured to set a size, position, and orientation of the first and second scaling frames of reference 80A and 80B based on the respective pairs of contact points 78A and 78B. In the illustrated example, the first and second scaling frames of reference 80A and 80B are spheres that have been positioned between the pairs of contact points. The scaling frames of reference may be generated and positioned using the similar logic as used to generate the simplified geometric representations of FIG. 10A.

At 1604, the method 1600 may include calculating an initial scaling distance 82A between the first scaling frame of reference 80A and the second scaling frame of reference 80B for the initial state of the system 41. As illustrated with reference to FIG. 17A, the initial scaling distance 82A may be calculated by determining a line between the first and second scaling frames of reference 80A and 80B. In one example, the processor 12 may be configured to generate a geometric shape, such as a cylinder, having a length dimension that spans between the pairs of contact points, and the initial scaling distance 82A may be calculated based on the length of the geometric shape.

At 1606, the method 1600 may include calculating a subsequent scaling distance 82B between the first scaling frame of reference 80A and the second scaling frame of reference 80B based on the subsequent states 48B of the at least two virtual manipulators 34A and 34B for the subsequent state of the system 41. As illustrated with reference to FIG. 17B, the two virtual manipulators 34A and 34B have moved to the subsequent states 48B. In this example, the first virtual manipulator 34A is farther away from the second virtual manipulator 34B compared to the initial states 48A. The processor 12 may then transform the scaling frames of reference 80A and 80B based on the subsequent states 48B of the virtual manipulators 34A and 34B. As illustrated, the processor 12 may then calculate the subsequent scaling distance 82B that measures a distance between the locations of the scaling frames of reference 80A and 80B for the subsequent state of the system 41.

At 1608, the method 1600 may include scaling a size of the virtual object 40 based on a ratio between the initial scaling distance 82A and the subsequent scaling distance 82B. As illustrated with reference to FIG. 17B, the virtual object 40 has been uniformly scaled proportionally to the ratio between the initial and subsequent scaling distances. In another example, the virtual object 40 may be stretched rather than uniformly scaled.

Using the techniques described in methods 400, 600, 800, 1200, 1400, and 1600, the computer system 10 may manipulate the positions, orientation, and sizes of virtual objects 40 with one or more virtual manipulators 34 using position based energy minimizing functions 44. It should be appreciated that while the drawings and the foregoing description include examples of one or two virtual manipulators interacting with a single object floating in three-dimensional space of the virtual environment, the position based energy minimizing functions and processes described herein may be configured to process systems that include any number of virtual manipulators and virtual objects. For example, systems that include three or more virtual manipulators interacting with a plurality of virtual objects may also be processed via energy minimizing according to the methods described herein. Additionally, it should be appreciated that the described position based energy minimization may also be performed on virtual objects that are constrained in one or more degrees (e.g. a lever or button attached to a world-locked virtual object or frame, a doorknob constrained to rotate around an axis, etc.).

With reference to FIG. 11, mathematics related to the rules and assumptions used in an example position-based energy minimizing function 44 that may be utilized by the above described systems and methods will now be described. In one example, energy minimization may be solved using a Levenberg-Marquardt algorithm, as will be shown below. Using such a solver, the processor 12 may be configured to perform the energy minimizing functions and processes described herein. However, it should be appreciated that other suitable general-purpose algorithms or custom algorithms may be used to simultaneously minimize quadratic forms or other energy functions.

Energy-Minimizing Position Based Dynamics
Equations of Motion

Equivalence of Implicit Time Integration and Energy Minimization

Definitions $(x_t, v_t, a_t)$ ≡system state at time t (linear and angular)
$f_t^i$ ≡force and torque (wrench)i at time t
M ≡mass matrix
h ≡Δt Forward Predicted Future State
Using quantities at the current time
Momentum and constant external forces are applied
Constant external force may typically be gravity
Predict substantially no movement when a virtual object is grasped
Apply damping
Vt is the difference between current and previous positions
Twice as much as acceleration as the formula $$s = ut + \frac{1}{2}at^2$$

$$s_{t+1} = x_t + hv_t + h^2 M^{-1} f^{constant}$$

Solver Prediction Correction $$\Delta x \equiv x_{t+1} - s_{t+1}$$

Positionally-Defined Momentum Potential ("Kinetic Energy")

$$E_{t+1}^{kinetic} \equiv \frac{1}{2} \Delta x^T M \Delta x$$

$$M \Delta x = \nabla E_{t+1}^{kinetic}$$

Definition of Newtonian Implicit Time Integration $$x_{t+1} = x_t + h v_{t+1} \tag{1}$$

$$v_{t+1} = v_t + h a_{t+1} \tag{2}$$

$$f^{constant} + \Sigma_i f_{t+1}^i = M a_{t+1} \tag{3}$$

Position-Dependent Conservative Forces Assumption
Future forces are a function of future positions
Forces can be written as the gradient of a scalar potential energy function
Forces are not a function of velocities $$f_{t+1}^i(x_{t+1}) = -\nabla E_{t+1}^i(x_{t+1}) \tag{4}$$

Equivalence Derivation $$x_{t+1} = x_t + h v_t + h^2 M^{-1} [f^{constant} + \Sigma_i f_{t+1}^i] \tag{5}$$

$$x_{t+1} = s_{t+1} + h^2 M^{-1} \Sigma_i f_{t+1}^i \tag{6}$$

$$M \Delta x = h^2 \Sigma_i f_{t+1}^i \tag{7}$$

$$M \Delta x = -h^2 \Sigma_i \nabla E_{t+1}^i(x_{t+1}) \tag{8}$$

$$0 = \nabla E_{t+1}^{kinetic}(x_{t+1}) + h^2 \Sigma_i \nabla E_{t+1}^i(x_{t+1}) \tag{9}$$

Solve (9) by Energy Minimization
Solution to (9) is also the solution to (10)
Typical energy terms are quadratic $$x_{t+1} = \underset{x}{\mathrm{argmin}}\left[E_{t+1}^{kinetic}(x) + h^2 \sum_i E_{t+1}^i(x)\right] \quad (10)$$

Energies

Each of these terms have tunable associated weight K ("stiffness").

Kinetic Energy

Ignore this term to solve for equilibrium as if all spring-like oscillations have ceased. This term is unnecessary to have a unique solution in the example of two antipodal 6 DOF contact points.

This term enables forward dynamics such as after a virtual object is released from a grasp.

$$v \equiv \Delta\mathrm{pos\_component\_of\_x}$$
$$\omega \equiv \Delta\mathrm{angular\_component\_of\_x}$$
$$E^{kinetic} = \frac{1}{2}mv^2 + \frac{1}{2}I\omega^2$$

Angular Friction (Torsional, Rolling)/Thermal Energy

For each contact point k, minimize the angle between its new frame and its object-locked frame at the hypothetical new body pose, minimize rolling and torsional residuals independently to weight them differently, and/or minimize the cosine distance between the angles.

$$E^{k,angfric} = \frac{1}{2}\mathrm{theta\_residual}_k^2$$

Elastic Potential Energy

For each contact point k, calculate a depth measured along an outer sphere's line segment at the body's hypothetical new pose. Because two of these terms exist in opposition, they will center the virtual object between the fingertips of the virtual manipulator. In one example, one term per body be used to center the object along a skewer axis. This example may provide potential benefits when a penetration is large by causing the optimal energy to be more likely to be close to zero. A Hooke's law spring has the quadratic form:

$$E^{k,elastic} = \frac{1}{2}\mathrm{normal\_pen\_depth}_k^2$$

Linear Friction/Thermal Energy

For each contact point k, minimize perpendicular distance from the body's hypothetically posed line segment.

$$E^{k,linfric} = \frac{1}{2}\mathrm{perp\_residual}_k^2$$

$$E^{k,linfric} = \frac{1}{2}\mathrm{perp\_residual}_k^2$$

Jacobians

Parameterizations and Notation

6 DOF (position, axis*angle) parameterization $\theta_b^1$ for the body (to be solved for).

6 DOF (position, axis*angle) parameterization $\theta_{r,k}^1$ for each contact point's residual (to be minimized)

Intermediate conversion to quaternions or affine transform for calculating quantities and their derivatives.

Notation for Object a:
- $s_a$ = linear position $\in \mathbb{R}^3$
- $v_a$ = angle times axis orientation $\in \mathbb{R}^3$
- $q_a$ = quaternion orientation $\in S^3$
- $\theta_a \equiv (s_a, v_a)$
- $\phi_a = (s_a, q_a)$
- $M_a$ = rotation matrix $\in \mathbb{SO}(3)$
- $A$ = homogeneous transform $\in \mathbb{SE}(3)$
- superscript $\in \{0,1\}$ = at time 0 or 1

Calculating Per-Contact Residual

Each contact point provides a 6-component residual vector, which is calculated by multiplying affine transforms or quaternions, and converting the resulting transform into a (position, axis*angle) vector.

The transform from which we can read residual positions and angles:

$$R_k = (L_k)^{-1} \cdot (B^1)^{-1} \cdot F_k^1 \quad (1)$$

Which can be regarded as having this mathematical form:

$$R_k = A_k \cdot X(s_x, q_x(v_x)) \cdot C_k \quad (2)$$

$$q_{r,k} = q_{a,k} \cdot q_x \cdot q_{c,k} \quad (3)$$

Where $A_k$ and $C_k$ are constant known transforms.

Residuals and Jacobians $$\theta_{r,k} \quad (4)$$

$$\frac{\partial \theta_{r,k}}{\partial \theta_x} \quad (5)$$

Log Map Jacobian $$\frac{\partial v_{r,k}}{\partial q_{r,k}} \quad (6)$$

Exponential Map Jacobian $$\frac{\partial q_x}{\partial v_x} \quad (7)$$

Derivative of Rotation Matrix wrt Quarternion $$\frac{\partial M_x}{\partial q_x} \quad (8)$$

Derivatives of Angular Residuals with Respect to (Inverse) Body Orientation:

(3), (5), (6) =>

$$\frac{\partial v_{r,k}}{\partial v_x} \quad (8)$$

Derivatives of Linear Residuals with Respect to (Inverse) Body Position and orientation (2)=>

$$\frac{\partial s_{r,k}}{\partial s_x} \quad (9)$$

(2), (6), (7)=>

$$\frac{\partial s_{r,k}}{\partial v_x} \quad (10)$$

Derivatives of Angular Residuals with Respect to (Inverse) Body Position $$\frac{\partial v_{r,k}}{\partial s_x} \quad (11)$$

In some embodiments, the methods and processes described herein may be tied to a computing system of one or more computing devices. In particular, such methods and processes may be implemented as a computer-application program or service, an application-programming interface (API), a library, and/or other computer-program product.

Figure 18:
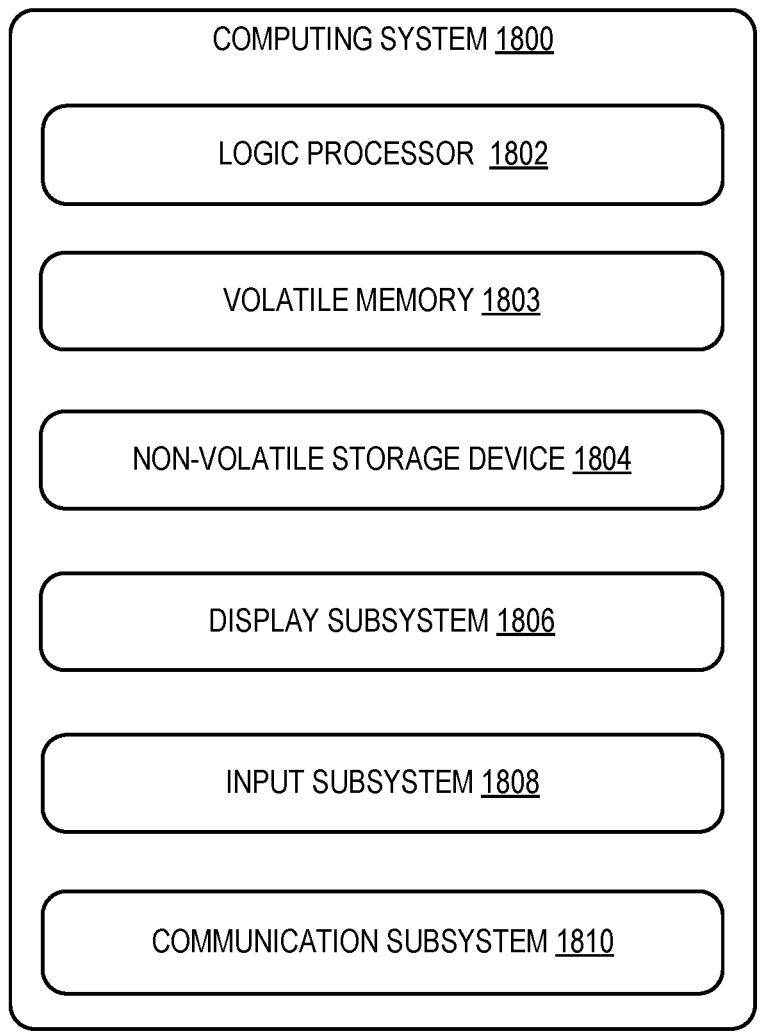
FIG. 18 shows a schematic view of an example computing environment in which the computer system of FIG. 1 may be enacted.

FIG. 18 schematically shows a non-limiting embodiment of a computing system 1800 that can enact one or more of the methods and processes described above. Computing system 1800 is shown in simplified form. Computing system 1800 may embody the computer system 10 described above and illustrated in FIG. 1. Computing system 1800 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 1800 includes a logic processor 1802 volatile memory 1804, and a non-volatile storage device 1806. Computing system 1800 may optionally include a display subsystem 1808, input subsystem 1810, communication subsystem 1812, and/or other components not shown in FIG. 18.

Logic processor 1802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1806 includes one or more physical devices configured to hold instructions executable by the logic processors to implement the methods and processes described herein. When such methods and processes are implemented, the state of non-volatile storage device 1806 may be transformed—e.g., to hold different data.

Non-volatile storage device 1806 may include physical devices that are removable and/or built-in. Non-volatile storage device 1806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1806 may include nonvolatile, dynamic, static, read/write, read-only, sequential-access, location-addressable, file-addressable, and/or content-addressable devices. It will be appreciated that non-volatile storage device 1806 is configured to hold instructions even when power is cut to the non-volatile storage device 1806.

Volatile memory 1804 may include physical devices that include random access memory. Volatile memory 1804 is typically utilized by logic processor 1802 to temporarily store information during processing of software instructions. It will be appreciated that volatile memory 1804 typically does not continue to store instructions when power is cut to the volatile memory 1804.

Aspects of logic processor 1802, volatile memory 1804, and non-volatile storage device 1806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1800 typically implemented in software by a processor to perform a particular function using portions of volatile memory, which function involves transformative processing that specially configures the processor to perform the function. Thus, a module, program, or engine may be instantiated via logic processor 1802 executing instructions held by non-volatile storage device 1806, using portions of volatile memory 1804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1808 may be used to present a visual representation of data held by non-volatile storage device 1806. The visual representation may take the form of a graphical user interface (GUI). As the herein described methods and processes change the data held by the non-volatile storage device, and thus transform the state of the non-volatile storage device, the state of display subsystem 1808 may likewise be transformed to visually represent changes in the underlying data. Display subsystem 1808 may include one or more display devices utilizing virtually any type of technology. Such display devices may be combined with logic processor 1802, volatile memory 1804, and/or non-volatile storage device 1806 in a shared enclosure, or such display devices may be peripheral display devices.

When included, input subsystem 1810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1812 may be configured to communicatively couple various computing devices described herein with each other, and with other devices. Communication subsystem 1812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1800 to send and/or receive messages to and/or from other devices via a network such as the Internet.

The following paragraphs provide additional support for the claims of the subject application. One aspect provides a computer system comprising an input system, and a processor configured to control a virtual manipulator based on input data received from the input system, the virtual manipulator being configured to manipulate a virtual object in a virtual environment. The processor is further configured to determine an initial state of a system that includes at least an initial state of the virtual manipulator and an initial state of the virtual object, detect at least one contact point between a portion of the virtual manipulator and the virtual object, determine one or more positional quantities for the initial state of the system, detect a subsequent state of the virtual manipulator, and determine one or more positional quantities for a subsequent state of the system that includes the subsequent state of the virtual manipulator. The processor is further configured to calculate a subsequent state for the virtual object that minimizes a set of energies or residuals defined in terms of the one or more positional quantities determined for the initial state of the system and the one or more positional quantities determined for the subsequent state of the system using a position-based energy minimizing function. The processor is further configured to move the virtual object to the calculated subsequent state. In this aspect, additionally or alternatively, the one or more positional quantities may be selected from the group consisting of a frame of reference, a contact point tangential component for friction, a position, a normal, and a penetration depth. In this aspect, additionally or alternatively, the set of energies or residuals may be selected from the group consisting of a kinetic energy, a penetration depth residual, a tangential friction residual, an angular friction residual, a normal residual, and a frame of reference residual. In this aspect, additionally or alternatively, the initial state and the subsequent state of the virtual object may include three-dimensional positions and orientations of the virtual object in the virtual environment, and wherein the initial state and the subsequent state of the virtual manipulator may include respective three-dimensional positions and orientations of the portion of the virtual manipulator in the virtual environment. In this aspect, additionally or alternatively, the processor may be configured to track a position of a user's hand via the input data received from the input system, and the virtual manipulator may be a graphical representation of a hand or grasping tool that is controlled based on the tracked position of the user's hand. In this aspect, additionally or alternatively, the one or more positional quantities may include a frame of reference of the virtual manipulator, and the processor may be configured to, based on detecting the at least one contact point between the portion of the virtual manipulator and the virtual object, determine a relative state of the virtual object compared to the frame of reference of the virtual manipulator. The processor may be further configured to calculate the subsequent state for the virtual object that minimizes an energy or residual defined in terms of the relative state of the virtual object compared to the frame of reference of the virtual manipulator for the initial state of the system and the relative state of the virtual object compared to the frame of reference of the virtual manipulator for the subsequent state of the system. In this aspect, additionally or alternatively, the portion of the virtual manipulator may include at least a first articulable portion and a second articulable portion, and the processor may be further configured to detect at least two contact points including a first contact point between the first articulable portion and the virtual object and a second contact point between the second articulable portion and the virtual object. In this aspect, additionally or alternatively, to detect the at least two contact points, the processor may be further configured to determine a closest point on the first articulable portion relative to the second articulable portion, determine a closest point on the second articulable portion relative to the first articulable portion, determine a line that intersects the closest point on the first articulable portion and the closest point on the second articulable portion and extends outward from the closest points, detect at least two points on the surface of the virtual object that intersect the line as being the at least two contact points, and determine the positions for the at least two contact points based on the intersections between the line and the surface of the virtual object. In this aspect, additionally or alternatively, the processor may be further configured to generate a simplified geometric representation of the virtual object based on the positions for the at least two contact points that were determined based on the intersections between the line and the surface of the virtual object. In this aspect, additionally or alternatively, the one or more positional quantities may include a normal, and the processor may be further configured to determine one or more normals for the at least two contact points to be parallel to the line, and the processor may be configured to calculate the subsequent state for the virtual object that minimizes an energy or residual defined in terms of the one or more normals for the at least two contact points determined for the initial state of the system and the one or more normals for the at least two contact points determined for the subsequent state of the system using the position-based energy minimizing function. In this aspect, additionally or alternatively, the processor may be configured to control at least two virtual manipulators based on input data received from the input system, each virtual manipulator respectively including at least a first articulable portion and a second articulable portion. The processor may be further configured to detect at least two pairs of contact points including a first pair of contact points between a first virtual manipulator and the virtual object and a second pair of contact points between a second virtual manipulator and the virtual object, and determine one or more positional quantities for the initial state of the system that includes at least initial states for the at least two virtual manipulators, the initial state for the virtual object, and initial states for the first pair of contact points and second pair of contact points. The processor may be further configured to detect subsequent states of the at least two virtual manipulators, determine one or more positional quantities for the subsequent state of the system, and calculate the subsequent state for the virtual object that minimizes the set of energies or residuals defined in terms of the one or more positional quantities determined for the initial state of the system and the one or more positional quantities determined for the subsequent state of the system using the position-based energy minimizing function. In this aspect, additionally or alternatively, the one or more positional quantities may include a scaling frame of reference, and the processor may be configured to determine a first scaling frame of reference based on the first pair of contact points and a second scaling frame of reference based on the second pair of contact points, calculate an initial scaling distance between the first scaling frame of reference and the second scaling frame reference for the initial state of the system, calculate a subsequent scaling distance between the first scaling frame of reference and the second scaling frame of reference based on the subsequent states of the at least two virtual manipulators for the subsequent state of the system, and scale a size of the virtual object based on a ratio between the initial scaling distance and the subsequent scaling distance. In this aspect, additionally or alternatively, the processor may be configured to define a plurality of predetermined grasping points on the portion of the virtual manipulator, detect contact points between the plurality of predetermined grasping points and the surface of the virtual object, and calculate a coordinate system transformation between the plurality of predetermined grasping points at the initial state of the virtual manipulator and the plurality of grasping points at the subsequent state of the virtual manipulator. The processor may be further configured to calculate the subsequent state of the virtual object based on the calculated coordinate system transformation and positions of the contact points.

Another aspect provides a method comprising, at a processor, controlling a virtual manipulator based on input data received from an input system, the virtual manipulator being configured to manipulate a virtual object in a virtual environment. The method may further include determining an initial state of a system that includes at least an initial state of the virtual manipulator and an initial state of the virtual object, detecting at least one contact point between a portion of the virtual manipulator and the virtual object, determining one or more positional quantities for the initial state of the system, detecting a subsequent state of the virtual manipulator, and determining one or more positional quantities for a subsequent state of the system that includes the subsequent state of the virtual manipulator. The method may further include calculating a subsequent state for the virtual object that minimizes a set of energies or residuals defined in terms of the one or more positional quantities determined for the initial state of the system and the one or more positional quantities determined for the subsequent state of the system using a position-based energy minimizing function. The method may further include moving the virtual object to the calculated subsequent state. In this aspect, additionally or alternatively, the one or more positional quantities may include a frame of reference of the virtual manipulator, and the method may further include, based on detecting the at least one contact point between the portion of the virtual manipulator and the virtual object, determining a relative state of the virtual object compared to the frame of reference of the virtual manipulator. The method may further include calculating the subsequent state for the virtual object that minimizes an energy or residual defined in terms of the relative state of the virtual object compared to the frame of reference of the virtual manipulator for the initial state of the system and the relative state of the virtual object compared to the frame of reference of the virtual manipulator for the subsequent state of the system. In this aspect, additionally or alternatively, the portion of the virtual manipulator may include at least a first articulable portion and a second articulable portion, and the method may further include determining a closest point on the first articulable portion relative to the second articulable portion, determining a closest point on the second articulable portion relative to the first articulable portion, determining a line that intersects the closest point on the first articulable portion and the closest point on the second articulable portion and extends outward from the closest points, detecting at least two points on the surface of the virtual object that intersect the line as being at least two contact points, and determining the position for the at least two contact points based on the intersections between the line and the surface of the virtual object. In this aspect, additionally or alternatively, the one or more positional quantities may include a normal, and the method may further include determining one or more normals for the at least two contact points to be parallel to the line. The method may further include calculating the subsequent state for the virtual object that minimizes an energy or residual defined in terms of the one or more normals for the at least two contact points determined for the initial state of the system and the one or more normals for the at least two contact points determined for the subsequent state of the system using the position-based energy minimizing function. In this aspect, additionally or alternatively, the method may further include controlling at least two virtual manipulators based on input data received from the input system, each virtual manipulator respectively including at least a first articulable portion and a second articulable portion. The method may further include detecting at least two pairs of contact points including a first pair of contact points between a first virtual manipulator and the virtual object and a second pair of contact points between a second virtual manipulator and the virtual object, and determining one or more positional quantities for the initial state of the system that includes at least initial states for the at least two virtual manipulators, the initial state for the virtual object, and initial states for the first pair of contact points and second pair of contact points. The method may further include detecting subsequent states of the at least two virtual manipulators, determining one or more positional quantities for the subsequent state of the system, and calculating the subsequent state for the virtual object that minimizes the set of energies or residuals defined in terms of the one or more positional quantities determined for the initial state of the system and the one or more positional quantities determined for the subsequent state of the system using the position-based energy minimizing function. In this aspect, additionally or alternatively, the one or more positional quantities may include a scaling frame of reference, and the method may further include determining a first scaling frame of reference based on the first pair of contact points and a second scaling frame of reference based on the second pair of contact points, calculating an initial scaling distance between the first scaling frame of reference and the second scaling frame of reference for the initial state of the system, calculating a subsequent scaling distance between the first scaling frame of reference and the second scaling frame of reference based on the subsequent positions of the at least two virtual manipulators for the subsequent state of the system, and scaling a size of the virtual object based on a ratio between the initial scaling distance and the subsequent scaling distance.

Another aspect provides a head computed display device comprising a near-eye display, a camera system configured to capture images of a user's hand, and a processor. The processor is configured to track a position of the user's hand based on the captured images received from the camera system, and control a virtual manipulator based on the tracked position of the user's hand, the virtual manipulator being configured to manipulate a virtual object in a virtual environment. The processor is further configured to determine an initial state of a system that includes at least an initial state of the virtual manipulator and an initial state of the virtual object, detect at least one contact point between a portion of the virtual manipulator and the virtual object, determine one or more positional quantities for the initial state of the system, detect a subsequent state of the virtual manipulator, and determine one or more positional quantities for a subsequent state of the system that includes the subsequent state of the virtual manipulator. The processor is further configured to calculate a subsequent state for the virtual object that minimizes a set of energies or residuals defined in terms of the one or more positional quantities determined for the initial state of the system and the one or more positional quantities determined for the subsequent state of the system using a position-based energy minimizing function. The processor is further configured to move the virtual object to the calculated subsequent state and display the subsequent state of the system in the virtual environment via the near-eye display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
an input system; and
a processor configured to:
control a virtual manipulator based on input data received from the input system, the virtual manipulator being configured to manipulate a virtual object in a virtual environment;
determine an initial state of a system that includes at least an initial state of the virtual manipulator and an initial state of the virtual object;
detect at least one contact point between a portion of the virtual manipulator and the virtual object;
determine one or more positional quantities for the initial state of the system;
detect a subsequent state of the virtual manipulator;
determine one or more positional quantities for a subsequent state of the system that includes the subsequent state of the virtual manipulator;
calculate a subsequent state for the virtual object that minimizes a set of energies or residuals defined in terms of the one or more positional quantities determined for the initial state of the system and the one or more positional quantities determined for the subsequent state of the system using a position-based energy minimizing function; and
move the virtual object to the calculated subsequent state;
wherein the initial state and the subsequent state of the virtual object include three-dimensional positions and orientations of the virtual object in the virtual environment, and wherein the initial state and the subsequent state of the virtual manipulator include respective three-dimensional positions and orientations of the portion of the virtual manipulator in the virtual environment.

2. The computer system of claim 1, wherein the one or more positional quantities are selected from the group consisting of a frame of reference, a contact point tangential component for friction, a position, a normal, and a penetration depth.

3. The computer system of claim 1, wherein the set of energies or residuals are selected from the group consisting of a kinetic energy, a penetration depth residual, a tangential friction residual, an angular friction residual, a normal residual, and a frame of reference residual.

4. The computer system of claim 1, wherein the processor is configured to track a position of a user's hand via the input data received from the input system; and wherein
the virtual manipulator is a graphical representation of a hand or grasping tool that is controlled based on the tracked position of the user's hand.

5. The computer system of claim 1, wherein the one or more positional quantities include a frame of reference of the virtual manipulator, and wherein the processor is configured to:
based on detecting the at least one contact point between the portion of the virtual manipulator and the virtual object, determine a relative state of the virtual object compared to the frame of reference of the virtual manipulator; and
calculate the subsequent state for the virtual object that minimizes an energy or residual defined in terms of the relative state of the virtual object compared to the frame of reference of the virtual manipulator for the initial state of the system and the relative state of the virtual object compared to the frame of reference of the virtual manipulator for the subsequent state of the system.

6. The computer system of claim 1, wherein the portion of the virtual manipulator includes at least a first articulable portion and a second articulable portion; and
   wherein the processor is further configured to detect at least two contact points including a first contact point between the first articulable portion and the virtual object and a second contact point between the second articulable portion and the virtual object.

7. The computer system of claim 6, wherein to detect the at least two contact points, the processor is further configured to:
   determine a closest point on the first articulable portion relative to the second articulable portion;
   determine a closest point on the second articulable portion relative to the first articulable portion;
   determine a line that intersects the closest point on the first articulable portion and the closest point on the second articulable portion and extends outward from the closest points;
   detect at least two points on the surface of the virtual object that intersect the line as being the at least two contact points; and
   determine the positions for the at least two contact points based on the intersections between the line and the surface of the virtual object.

8. The computer system of claim 7, wherein the processor is further configured to:
   generate a simplified geometric representation of the virtual object based on the positions for the at least two contact points that were determined based on the intersections between the line and the surface of the virtual object.

9. The computer system of claim 7, wherein the one or more positional quantities include a normal, and the processor is further configured to determine one or more normals for the at least two contact points to be parallel to the line; and
   wherein the processor is configured to calculate the subsequent state for the virtual object that minimizes an energy or residual defined in terms of the one or more normals for the at least two contact points determined for the initial state of the system and the one or more normals for the at least two contact points determined for the subsequent state of the system using the position-based energy minimizing function.

10. The computer system of claim 6, wherein the processor is configured to:
    control at least two virtual manipulators based on input data received from the input system, each virtual manipulator respectively including at least a first articulable portion and a second articulable portion;
    detect at least two pairs of contact points including a first pair of contact points between a first virtual manipulator and the virtual object and a second pair of contact points between a second virtual manipulator and the virtual object;
    determine one or more positional quantities for the initial state of the system that includes at least initial states for the at least two virtual manipulators, the initial state for the virtual object, and initial states for the first pair of contact points and second pair of contact points;
    detect subsequent states of the at least two virtual manipulators;
    determine one or more positional quantities for the subsequent state of the system;
    calculate the subsequent state for the virtual object that minimizes the set of energies or residuals defined in terms of the one or more positional quantities determined for the initial state of the system and the one or more positional quantities determined for the subsequent state of the system using the position-based energy minimizing function.

11. The computer system of claim 10, wherein the one or more positional quantities include a scaling frame of reference, and wherein the processor is configured to:
    determine a first scaling frame of reference based on the first pair of contact points and a second scaling frame of reference based on the second pair of contact points;
    calculate an initial scaling distance between the first scaling frame of reference and the second scaling frame reference for the initial state of the system;
    calculate a subsequent scaling distance between the first scaling frame of reference and the second scaling frame of reference based on the subsequent states of the at least two virtual manipulators for the subsequent state of the system; and
    scale a size of the virtual object based on a ratio between the initial scaling distance and the subsequent scaling distance.

12. The computer system of claim 1, wherein the processor is configured to:
    define a plurality of predetermined grasping points on the portion of the virtual manipulator;
    detect contact points between the plurality of predetermined grasping points and the surface of the virtual object;
    calculate a coordinate system transformation between the plurality of predetermined grasping points at the initial state of the virtual manipulator and the plurality of grasping points at the subsequent state of the virtual manipulator; and
    wherein the processor is further configured to calculate the subsequent state of the virtual object based on the calculated coordinate system transformation and positions of the contact points.

13. A method comprising:
    at a processor:
       controlling a virtual manipulator based on input data received from an input system, the virtual manipulator being configured to manipulate a virtual object in a virtual environment;
       determining an initial state of a system that includes at least an initial state of the virtual manipulator and an initial state of the virtual object;
       detecting at least one contact point between a portion of the virtual manipulator and the virtual object;
       determining one or more positional quantities for the initial state of the system;
       detecting a subsequent state of the virtual manipulator;
       determining one or more positional quantities for a subsequent state of the system that includes the subsequent state of the virtual manipulator;
       calculating a subsequent state for the virtual object that minimizes a set of energies or residuals defined in terms of the one or more positional quantities determined for the initial state of the system and the one or more positional quantities determined for the subsequent state of the system using a position-based energy minimizing function; and
       moving the virtual object to the calculated subsequent state;
    wherein the initial state and the subsequent state of the virtual object include three-dimensional positions and orientations of the virtual object in the virtual environment, and wherein the initial state and the subsequent state of the virtual manipulator include respective three-dimensional positions and orientations of the portion of the virtual manipulator in the virtual environment.

14. The method of claim 13, wherein the one or more positional quantities include a frame of reference of the virtual manipulator, and wherein the method further comprises:
based on detecting the at least one contact point between the portion of the virtual manipulator and the virtual object, determining a relative state of the virtual object compared to the frame of reference of the virtual manipulator; and
calculating the subsequent state for the virtual object that minimizes an energy or residual defined in terms of the relative state of the virtual object compared to the frame of reference of the virtual manipulator for the initial state of the system and the relative state of the virtual object compared to the frame of reference of the virtual manipulator for the subsequent state of the system.

15. The method of claim 13, wherein the portion of the virtual manipulator includes at least a first articulable portion and a second articulable portion; and
wherein the method further comprises:
determining a closest point on the first articulable portion relative to the second articulable portion;
determining a closest point on the second articulable portion relative to the first articulable portion;
determining a line that intersects the closest point on the first articulable portion and the closest point on the second articulable portion and extends outward from the closest points;
detecting at least two points on the surface of the virtual object that intersect the line as being at least two contact points; and
determining the position for the at least two contact points based on the intersections between the line and the surface of the virtual object.

16. The method of claim 15, wherein the one or more positional quantities include a normal, and the method further comprises:
determining one or more normals for the at least two contact points to be parallel to the line; and
calculating the subsequent state for the virtual object that minimizes an energy or residual defined in terms of the one or more normals for the at least two contact points determined for the initial state of the system and the one or more normals for the at least two contact points determined for the subsequent state of the system using the position-based energy minimizing function.

17. The method of claim 15, further comprising:
controlling at least two virtual manipulators based on input data received from the input system, each virtual manipulator respectively including at least a first articulable portion and a second articulable portion;
detecting at least two pairs of contact points including a first pair of contact points between a first virtual manipulator and the virtual object and a second pair of contact points between a second virtual manipulator and the virtual object;
determining one or more positional quantities for the initial state of the system that includes at least initial states for the at least two virtual manipulators, the initial state for the virtual object, and initial states for the first pair of contact points and second pair of contact points;
detecting subsequent states of the at least two virtual manipulators;
determining one or more positional quantities for the subsequent state of the system; and
calculating the subsequent state for the virtual object that minimizes the set of energies or residuals defined in terms of the one or more positional quantities determined for the initial state of the system and the one or more positional quantities determined for the subsequent state of the system using the position-based energy minimizing function.

18. The method of claim 17, wherein the one or more positional quantities include a scaling frame of reference, and wherein the method further comprises:
determining a first scaling frame of reference based on the first pair of contact points and a second scaling frame of reference based on the second pair of contact points;
calculating an initial scaling distance between the first scaling frame of reference and the second scaling frame of reference for the initial state of the system;
calculating a subsequent scaling distance between the first scaling frame of reference and the second scaling frame of reference based on the subsequent positions of the at least two virtual manipulators for the subsequent state of the system; and
scaling a size of the virtual object based on a ratio between the initial scaling distance and the subsequent scaling distance.

19. A head computed display device comprising:
a near-eye display;
a camera system configured to capture images of a user's hand; and
a processor configured to:
track a position of the user's hand based on the captured images received from the camera system;
control a virtual manipulator based on the tracked position of the user's hand, the virtual manipulator being configured to manipulate a virtual object in a virtual environment;
determine an initial state of a system that includes at least an initial state of the virtual manipulator and an initial state of the virtual object;
detect at least one contact point between a portion of the virtual manipulator and the virtual object;
determine one or more positional quantities for the initial state of the system;
detect a subsequent state of the virtual manipulator;
determine one or more positional quantities for a subsequent state of the system that includes the subsequent state of the virtual manipulator;
calculate a subsequent state for the virtual object that minimizes a set of energies or residuals defined in terms of the one or more positional quantities determined for the initial state of the system and the one or more positional quantities determined for the subsequent state of the system using a position-based energy minimizing function;
move the virtual object to the calculated subsequent state and
display the subsequent state of the system in the virtual environment via the near-eye display;
wherein the initial state and the subsequent state of the virtual object include three-dimensional positions and orientations of the virtual object in the virtual environment, and wherein the initial state and the subsequent state of the virtual manipulator include respective three-dimensional positions and orientations of the portion of the virtual manipulator in the virtual environment.

20. A computer system comprising:
an input system; and
a processor configured to:
control a virtual manipulator based on input data received from the input system, the virtual manipulator being configured to manipulate a virtual object in a virtual environment;
determine an initial state of a system that includes at least an initial state of the virtual manipulator and an initial state of the virtual object;
detect at least one contact point between a portion of the virtual manipulator and the virtual object;
determine one or more positional quantities for the initial state of the system;
detect a subsequent state of the virtual manipulator;
determine one or more positional quantities for a subsequent state of the system that includes the subsequent state of the virtual manipulator;
calculate a subsequent state for the virtual object that minimizes a set of energies or residuals defined in terms of the one or more positional quantities determined for the initial state of the system and the one or more positional quantities determined for the subsequent state of the system using a position-based energy minimizing function; and
move the virtual object to the calculated subsequent state;
wherein the portion of the virtual manipulator includes at least a first articulable portion and a second articulable portion; and
wherein the processor is further configured to detect at least two contact points including a first contact point between the first articulable portion and the virtual object and a second contact point between the second articulable portion and the virtual object.

* * * * *